(12) United States Patent
Choi et al.

(10) Patent No.: US 12,466,917 B2
(45) Date of Patent: *Nov. 11, 2025

(54) POLYAMIDE RESIN, AND POLYMER FILM, RESIN LAMINATE USING THE SAME

(71) Applicant: LG CHEM, LTD., Seoul (KR)

(72) Inventors: Il Hwan Choi, Daejeon (KR); Soonyong Park, Daejeon (KR); Bi Oh Ryu, Daejeon (KR); Young Ji Tae, Daejeon (KR); Youngseok Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 930 days.

This patent is subject to a terminal disclaimer.

(21) Appl. No.: 16/972,485

(22) PCT Filed: Nov. 1, 2019

(86) PCT No.: PCT/KR2019/014715
§ 371 (c)(1),
(2) Date: Sep. 24, 2021

(87) PCT Pub. No.: WO2020/096284
PCT Pub. Date: May 14, 2020

(65) Prior Publication Data
US 2022/0033653 A1    Feb. 3, 2022

(30) Foreign Application Priority Data

Nov. 5, 2018   (KR) .................. 10-2018-0134755
Dec. 3, 2018   (KR) .................. 10-2018-0153911
(Continued)

(51) Int. Cl.
*C08G 69/32*   (2006.01)
*C08G 69/26*   (2006.01)
(Continued)

(52) U.S. Cl.
CPC ........... *C08G 69/32* (2013.01); *C08G 69/265* (2013.01); *C08G 69/28* (2013.01); *C08G 69/42* (2013.01);
(Continued)

(58) Field of Classification Search
CPC ...... C08G 69/32; C08G 69/265; C08G 69/28; C08G 69/42; C08G 81/00; C08J 7/046;
(Continued)

(56) References Cited

U.S. PATENT DOCUMENTS 3,554,966 A   1/1971   Jones et al.
5,076,817 A   12/1991  Hayes
(Continued)

FOREIGN PATENT DOCUMENTS

CN   1708537 A    12/2005
CN   104072757 A  10/2014
(Continued)

OTHER PUBLICATIONS

Extended European Search Report dated Aug. 3, 2021 of the corresponding European Patent Application No. 19882480.7, 6 pages.
(Continued)

*Primary Examiner* — Shane Fang
(74) *Attorney, Agent, or Firm* — ROTHWELL, FIGG, ERNST & MANBECK, P.C.

(57) ABSTRACT

The present invention relates to a polyamide resin in which an average particle size of individual crystals measured by a small-angle X-ray scattering apparatus is 8.0 nm or less, and a UV-cut slope (dT/dλ) measured for a specimen having a thickness of 45 μm or more and 55 μm or less according to ASTM E424 is 0.25 or more in the range of 10% to 80% transmittance, and a polymer film and resin laminate using the same. In addition, the present invention relates to a
(Continued)

polyamide resin with characteristic profile in which a small-angle X-ray scattering function obtained by irradiating the polyamide resin with X-rays having an energy of 10 KeV to 20 KeV using a small-angle X-ray scattering apparatus satisfies Equation 1 and Equation 2, and a polymer film and resin laminate using the same.

16 Claims, 5 Drawing Sheets

(30) Foreign Application Priority Data

| Feb. 1, 2019 | (KR) | 10-2019-0014022 |
|---|---|---|
| Mar. 26, 2019 | (KR) | 10-2019-0034611 |
| Oct. 11, 2019 | (KR) | 10-2019-0125890 |
| Oct. 31, 2019 | (KR) | 10-2019-0137544 |
| Oct. 31, 2019 | (KR) | 10-2019-0137545 |

(51) Int. Cl.
    *C08G 69/28*      (2006.01)
    *C08G 69/42*      (2006.01)
    *C08G 81/00*      (2006.01)
    *C08J 5/18*      (2006.01)
    *C08J 7/046*      (2020.01)
    *C08L 77/10*      (2006.01)

(52) U.S. Cl.
    CPC .............. *C08G 81/00* (2013.01); *C08J 5/18* (2013.01); *C08J 7/046* (2020.01); *C08L 77/10* (2013.01); *C08J 2377/10* (2013.01); *C08L 2201/08* (2013.01); *C08L 2201/10* (2013.01); *C08L 2203/16* (2013.01); *C08L 2203/20* (2013.01); *C08L 2203/30* (2013.01)

(58) Field of Classification Search
    CPC ......... C08J 5/18; C08J 2377/10; C08L 77/10; C08L 2201/08; C08L 2201/10; C08L 2203/16; C08L 2203/20; C08L 2203/30
    See application file for complete search history.

(56) References Cited

U.S. PATENT DOCUMENTS

| 7,851,061 | B2 | 12/2010 | Han et al. |
|---|---|---|---|
| 8,648,982 | B2 | 2/2014 | Yanai et al. |
| 8,759,476 | B2 | 6/2014 | Desbois et al. |
| 8,834,755 | B2 | 9/2014 | Han et al. |
| 9,963,548 | B1 | 5/2018 | Sun et al. |
| 10,316,145 | B2 | 6/2019 | Park et al. |
| 10,526,451 | B2 | 1/2020 | Ju et al. |
| 10,738,173 | B2 | 8/2020 | Chae et al. |
| 2006/0106193 | A1 | 5/2006 | Moriyama et al. |
| 2006/0201664 | A1 | 9/2006 | Yamasaki |
| 2006/0235169 | A1 | 10/2006 | Yamasaki |
| 2012/0238698 | A1 | 9/2012 | Cho et al. |
| 2012/0296037 | A1 | 11/2012 | Cho et al. |
| 2013/0038822 | A1 | 2/2013 | Aono et al. |
| 2016/0208096 | A1 | 7/2016 | Sun et al. |
| 2017/0298181 | A1 | 10/2017 | Rulkens et al. |
| 2017/0329062 | A1 | 11/2017 | Nakajima et al. |
| 2019/0023846 | A1 | 1/2019 | Yun et al. |
| 2019/0077915 | A1 | 3/2019 | Yun et al. |

FOREIGN PATENT DOCUMENTS

| EP | 1564237 A1 | 8/2005 | |
|---|---|---|---|
| EP | 3366726 A1 | 8/2018 | |
| EP | 3412705 A1 | 12/2018 | |
| EP | 3392295 B1 | 1/2020 | |
| FR | 1487392 A | 7/1967 | |
| JP | S56-056827 A | 5/1981 | |
| JP | S63-267548 A | 11/1988 | |
| JP | 09158094 * | 6/1997 | ............. D21H 27/00 |
| JP | 2001-325720 A | 11/2001 | |
| JP | 2002-191928 A | 7/2002 | |
| JP | 2008-074991 A | 4/2008 | |
| JP | 2010-530459 A | 9/2010 | |
| JP | 2015-120886 A | 7/2015 | |
| JP | 2016-108482 A | 6/2016 | |
| JP | 2017-530218 A | 10/2017 | |
| KR | 10-1987-0001695 B1 | 9/1987 | |
| KR | 10-2005-0067217 A | 6/2005 | |
| KR | 10-2007-0061778 A | 6/2007 | |
| KR | 10-2009-0062498 A | 6/2009 | |
| KR | 10-2010-0138364 A | 12/2010 | |
| KR | 10-2012-0129319 A | 11/2012 | |
| KR | 10-2012-0130332 A | 11/2012 | |
| KR | 10-2013-0066618 A | 6/2013 | |
| KR | 10-2015-0070757 A | 6/2015 | |
| KR | 10-2015-0077177 A | 7/2015 | |
| KR | 10-2016-0089872 A | 7/2016 | |
| KR | 10-2017-0001644 A | 1/2017 | |
| KR | 10-2017-0131217 A | 11/2017 | |
| KR | 10-2017-0132499 A | 12/2017 | |
| KR | 10-2017-0136285 A | 12/2017 | |
| KR | 10-2018-0062439 A | 6/2018 | |
| KR | 10-2018-0098003 A | 9/2018 | |
| KR | 10-2018-0104304 A | 9/2018 | |
| WO | 2004-039863 A1 | 5/2004 | |
| WO | 2011-132680 A1 | 10/2011 | |
| WO | 2018-016138 A1 | 1/2018 | |

OTHER PUBLICATIONS

Extended European Search Report dated Aug. 9, 2021, of the corresponding European Patent Application No. 19881443.6, 7 pages.

Extended European Search Report dated Aug. 5, 2021, of the corresponding European Patent Application No. 19881153.1, 7 pages.

International Search Report in PCT/KR2019/014714, Feb. 18, 2020, 4 pages.

International Search Report in PCT/KR2019/014715, Feb. 19, 2020, 6 pages.

International Search Report in PCT/KR2019/014716, Feb. 19, 2020, 4 pages.

Singh, P. S., et al., "Synchrotron SAX to probe cross-linked network of polyamide 'reverse osmosis' and nanofiltration' membranes," J. of Membrane Science, vol. 421-422, 2012, pp. 51-59.

Yebra-Rodriguez, A., et al., "Crystalline properties of injection molded polyamide-6 and polyamide-6/montmorillonite nanocomposites," Applied Clay Science, Jan. 2009 vol. 43, Issue 1, pp. 91-97.

Chen, H., et al., "Investigation of the rigid amorphous fraction in nylon-6," J. of Thermal Analysis and Calorimetry, vol. 89 (2007) 2, pp. 417-425.

\* cited by examiner

[FIG. 1]
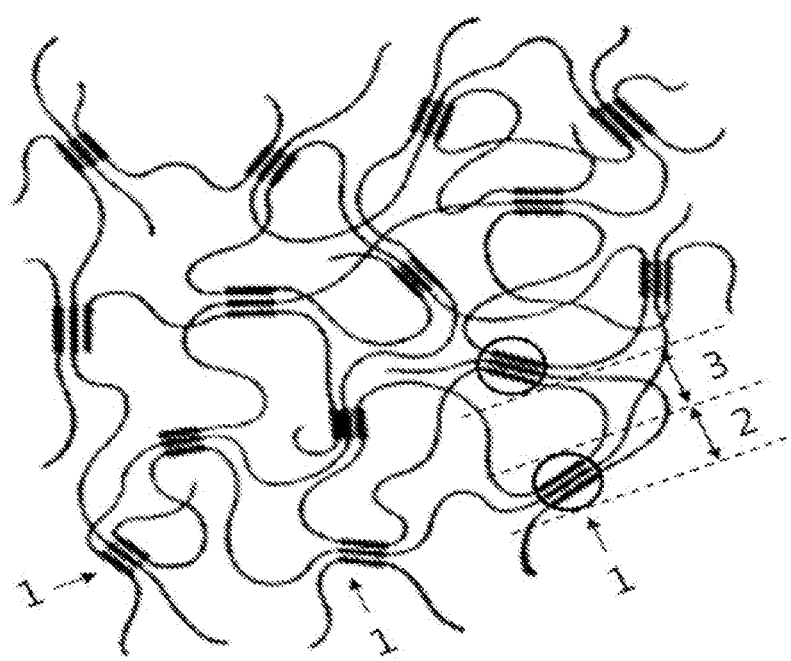

[FIG. 2]
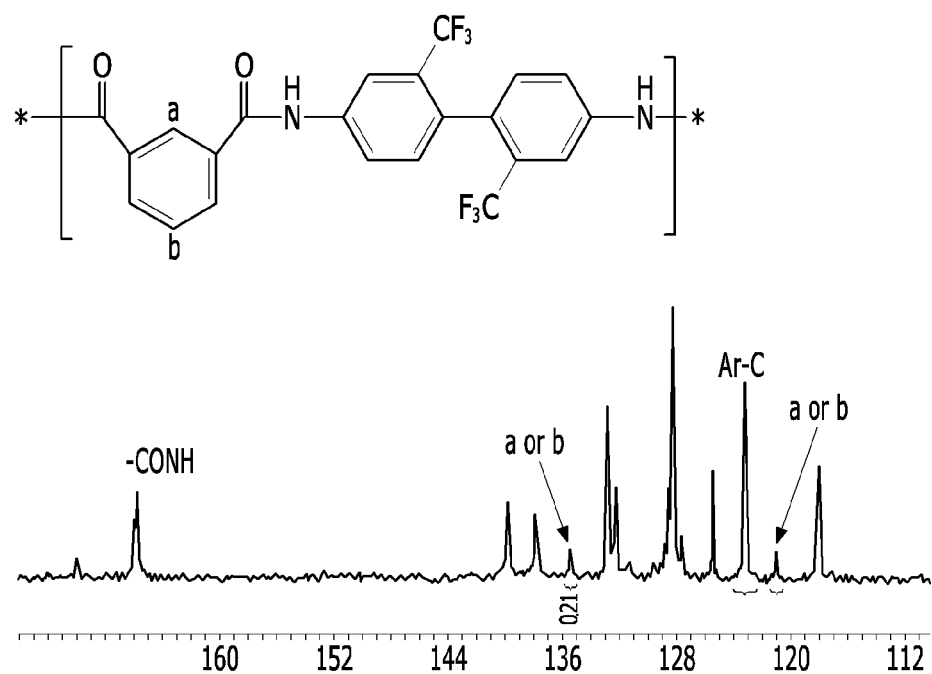

[FIG. 3]
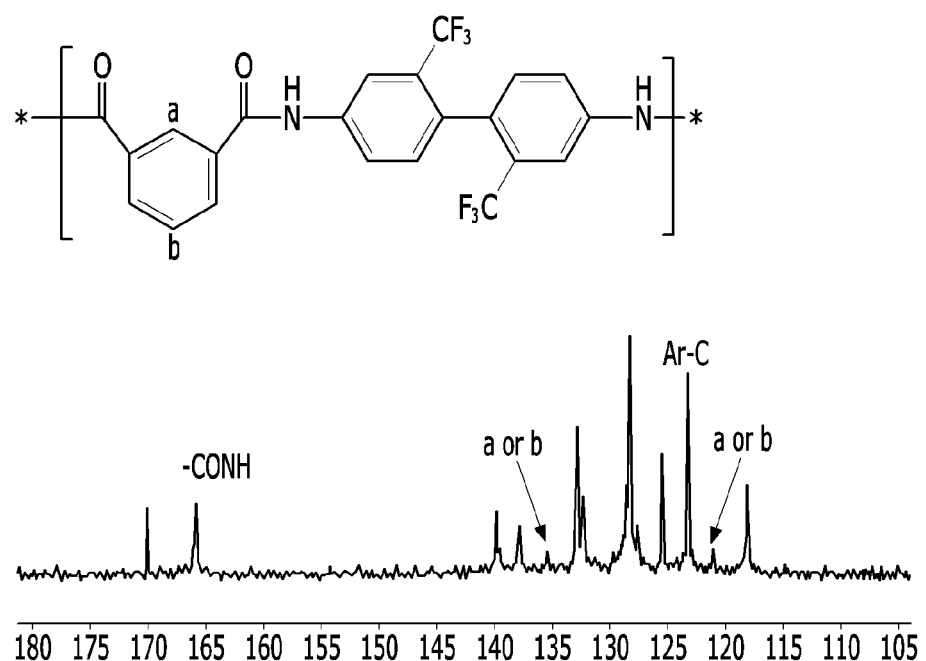

[FIG. 4]
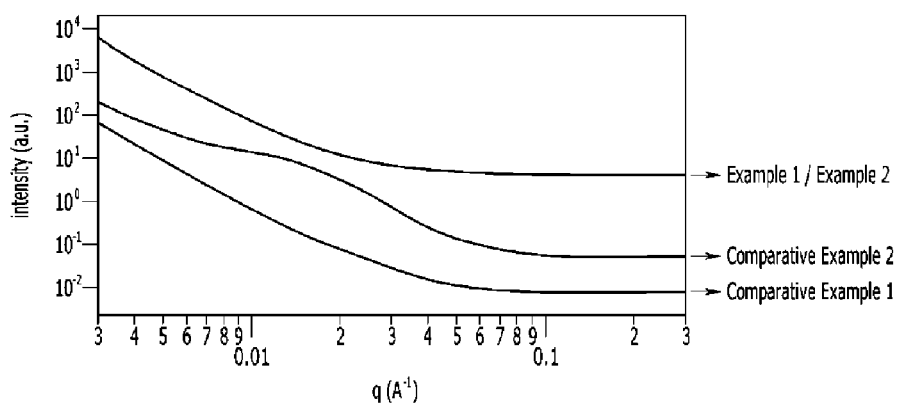

[FIG. 5]
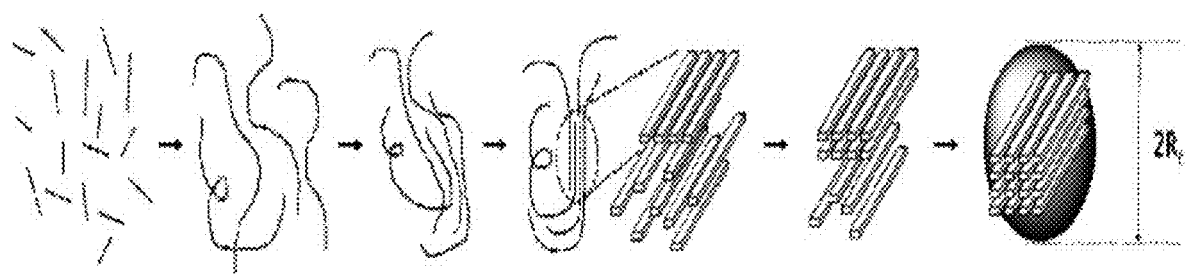

POLYAMIDE RESIN, AND POLYMER FILM, RESIN LAMINATE USING THE SAME

CROSS-REFERENCE TO RELATED APPLICATION(S)

This application is a 35 U.S.C. 371 National Phase Entry application from PCT/KR2019/014715, filed on Nov. 1, 2019, designating the United States, which claims the benefit of priority from Korean Patent Application No. 10-2018-0134755 filed on Nov. 5, 2018; Korean Patent Application No. 10-2018-0153911 filed on Dec. 3, 2018; Korean Patent Application No. 10-2019-0014022 filed on Feb. 1, 2019; Korean Patent Application No. 10-2019-0034611 filed on Mar. 26, 2019; Korean Patent Application No. 10-2019-0125890 filed on Oct. 11, 2019; Korean Patent Application No. 10-2019-0137544 filed on Oct. 31, 2019; and Korean Patent Application No. 10-2019-0137545 filed on Oct. 31, 2019 in the Korean Intellectual Property Office, the disclosures of which are incorporated herein by reference in their entirety.

TECHNICAL FIELD

The present invention relates to a polyamide resin that can secure at least an adequate level of mechanical properties while improving transparency by suppressing excessive growth of the length of crystalline polymer chains, and that is improved in UV shielding function, and a polymer film and resin laminate using the same.

The present invention also relates to a polyamide resin that can secure at least an adequate level of mechanical properties while improving transparency, and a polymer film and resin laminate using the same.

BACKGROUND OF THE INVENTION

Aromatic polyimide resins are polymers mostly having an amorphous structure, and exhibits excellent heat resistance, chemical resistance, electrical properties, and dimensional stability due to their rigid chain structure. Thus, these polyimide resins are widely used as materials for electric/electronics.

However, the polyimide resins have many limitations in their use because they may appear dark brown in color due to charge transfer complex (CTC) formation of Pi-electrons present in the imide chain, and it is difficult to secure transparency. In the case of the polyimide film including the same, it has a drawback in that the surface is easily scratched and scratch resistance is very weak.

In order to solve the above limitation of the polyimide resin, studies on polyamide resins into which an amide group is introduced has been actively conducted. The amide structure induces intermolecular or intramolecular hydrogen bonds, resulting in improvement of scratch resistance by interactions such as hydrogen bonds.

However, due to the difference in solubility, reactivity (steric hindrance), and reaction rate of terephthaloyl chloride or isophthaloyl chloride used for the synthesis of the polyamide resin, amide repeating units derived from terephthaloyl chloride and amide repeating units derived from isophthaloyl chloride do not form a block, and are hardly polymerized ideally or alternatively.

Therefore, there is a limit that as the block of amide repeating units derived from the para acyl chloride monomer is formed and the crystallinity of the polyamide resin increases, the transparency becomes poor due to haze.

In addition, as the monomers used for the synthesis of the polyamide resin perform the polymerization reaction in a state dissolved in a solvent, the molecular weight of the finally synthesized polyamide resin is difficult to be ensured to a sufficient level due to deterioration by moisture or mixing in solvents.

Accordingly, there is a continuing need to develop a polyamide resin capable of realizing transparency and mechanical properties simultaneously.

BRIEF SUMMARY OF THE INVENTION

The present invention provides a polyamide resin that can secure at least an adequate level of mechanical properties while improving transparency by suppressing excessive growth of the length of crystalline polymer chains, and that is improved in UV shielding function.

The present invention also provides a polyamide resin that can secure at least an adequate level of mechanical properties while improving transparency.

The present invention further provides a polymer film and resin laminate using the aforementioned polyamide resin.

One aspect of the present invention provides a polyamide resin in which an average particle size of individual crystals measured by a small-angle X-ray scattering apparatus is 8.0 nm or less, and a UV-cut slope (dT/dλ) measured for a specimen having a thickness of 45 μm or more and 55 μm or less according to ASTM E424 is 0.25 or more in the range of 10% to 80% transmittance.

Another aspect of the present invention provides a polyamide resin in which with respect to a specimen having a thickness of 45 μm or more and 55 μm or less, a small-angle X-ray scattering function I(q) (where X-axis is the wavenumber q and Y-axis is scattering intensity I) obtained by irradiating the polyamide resin with X-rays using a small-angle X-ray scattering apparatus satisfies the following Equation 1 and Equation 2.

$$d^2 I(q)/dq^2 > 0 \qquad \text{[Equation 1]}$$

in Equation 1, $0.003 \text{ Å}^{-1} \leq q \leq 0.03 \text{ Å}^{-1}$, $$I(q) \geq 1 \text{ a.u.} \qquad \text{[Equation 2]}$$

in Equation 2, $q \geq 0.08 \text{ Å}^{-1}$.

Another aspect of the present invention provides a polymer film including the aforementioned polyamide resin.

Yet another aspect of the present invention provides a resin laminate including a substrate including the polyamide resin; and a hard coating layer formed on at least one side of the substrate.

DETAILED DESCRIPTION OF THE INVENTION

Hereinafter, a polyamide resin and a polymer film and resin laminate using the same according to specific embodiments of the present invention will be described in more detail.

Unless explicitly stated otherwise, the terminology used herein may be defined as follows.

Throughout the specification, when one part "includes" one constituent element, unless otherwise specifically described, this does not mean that another constituent element is excluded, but means that another constituent element may be further included.

In the present specification, examples of the substituents are described below, but are not limited thereto.

As used herein, the term "substituted" means that other functional groups instead of a hydrogen atom in the compound are bonded, and a position to be substituted is not limited as long as the position is a position at which the hydrogen atom is substituted, that is, a position at which the substituent can be substituted, and when two or more are substituted, the two or more substituents may be the same as or different from each other.

As used herein, the term "substituted or unsubstituted" means being unsubstituted or substituted with one or more substituents selected from the group consisting of deuterium; a halogen group; a cyano group: a nitro group; a hydroxyl group; a carbonyl group: an ester group; an imide group; an amide group; a primary amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a haloalkyl group; a cycloalkyl group; an alkenyl group; an aryl group; an aralkyl group; an aralkenyl group; an alkylaryl group; an alkoxysilylalkyl group; an arylphosphine group; or a heterocyclic group containing at least one of N, O, and S atoms, or being unsubstituted or substituted with a substituent to which two or more substituents are linked among the substituents exemplified above. For example, "the substituent to which two or more substituents are linked" may be a biphenyl group. That is, the biphenyl group may also be an aryl group, and may be interpreted as a substituent to which two phenyl groups are linked. Preferably, a haloalkyl group can be used as the substituent, and examples of the haloalkyl group include trifluoromethyl group.

As used herein, the notation , or  means a bond linked to another substituent group, and a direct bond means the case where no other atoms exist in the parts represented as L.

In the present specification, the alkyl group is a monovalent functional group derived from an alkane, and may be a straight-chain or a branched-chain. The number of carbon atoms of the straight chain alkyl group is not particularly limited, but is preferably 1 to 20. Also, the number of carbon atoms of the branched chain alkyl group is 3 to 20. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, iso-pentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethylpropyl, isohexyl, 2-methylpentyl, 4-methylhexyl, 5-methylhexyl, 2,6-dimethylheptane-4-yl and the like, but are not limited thereto.

In the present specification, the aryl group is a monovalent functional group derived from an arene, and is not particularly limited, but preferably has 6 to 20 carbon atoms, and may be a monocyclic aryl group or a polycyclic aryl group. The monocyclic aryl group may include, but not limited to, a phenyl group, a biphenyl group, a terphenyl group, or the like. The polycyclic aryl group may include, but not limited to, a naphthyl group, an anthracenyl group, a phenanthryl group, a pyrenyl group, a perylenyl group, a chrysenyl group, a fluorenyl group or the like. The aryl group may be substituted or unsubstituted.

In the present specification, the arylene group is a bivalent functional group derived from an arene, and the description of the aryl group as defined above may be applied, except that it is a divalent functional group. For example, it may be a phenylene group, a biphenylene group, a terphenylene group, a divalent naphthalene group, a divalent fluorenyl group, a divalent pyrenyl group, a divalent phenanthrenyl group, a divalent perylene group, a divalent tetracenyl group, an divalent anthracenyl group and the like. The arylene group may be substituted or unsubstituted.

In the present specification, a heteroaryl group includes one or more atoms other than carbon, that is, one or more heteroatoms, and specifically, the heteroatom may include one or more atoms selected from the group consisting of O, N, Se, and S, and the like. The number of carbon atoms thereof is not particularly limited, but is preferably 4 to 20, and the heteroaryl group may be monocyclic or polycyclic. Examples of a heterocyclic group include a thiophene group, a furanyl group, a pyrrole group, an imidazolyl group, a thiazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a quinolinyl group, a quinazolinyl group, a quinoxalinyl group, a phthalazinyl group, a pyridopyrimidinyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a phenanthrolinyl group (phenanthroline), a thiazolyl group, an isoxazolyl group, an oxadiazolyl group, a thiadiazolyl group, a benzothiazolyl group, a phenothiazinyl group, an aziridinyl group, an azaindolyl group, an isoindolyl group, an indazolyl group, a purine group (purine), a pteridinyl group (pteridine), a beta-carboline group, a naphthyridinyl group (naphthyridine), a ter-pyridyl group, a phenazinyl group, an imidazopyridyl group, a pyropyridyl group, an azepine group, a pyrazolyl group, a dibenzofuranyl group, and the like, but are not limited thereto. The heteroaryl group may be substituted or unsubstituted.

In the present specification, the hetero arylene group has 2 to 20, or 2 to 10, or 6 to 20 carbon atoms. For the arylene group containing 0, N or S as a hetero atom, the description of the heteroaryl group as defined above can be applied except that it is a divalent functional group. The hetero arylene group may be substituted or unsubstituted.

In this specification, examples of halogen include fluorine, chlorine, bromine or iodine.

I. Polyamide Resin

According to one embodiment of the present invention, there can be provided a polyamide resin in which an average particle size of individual crystals measured by a small-angle X-ray scattering apparatus is 8.0 nm or less, and a UV-cut slope (dT/dλ) measured for a specimen having a thickness of 45 μm or more and 55 μm or less according to ASTM E424 is 0.25 or more in the range of 10% to 80% transmittance.

The present inventors have found through experiments that as the polyamide resin in which an average particle size of individual crystals is 8.0 nm or less as described above not only has excellent mechanical properties possessed by a crystalline polymer but also the growth of individual crystals forming the crystal structure slows down to have a relatively small size, whereby it has a remarkably low level of haze value, yellowness, etc., and additionally can have high flexibility and bending durability, thereby completing the present invention.

Unlike this, when the average particle size of individual crystals measured for the polyamide resin by a small-angle X-ray scattering apparatus increases excessively by 8.0 nm or more, the ratio occupied by the portion having crystallinity in the polyamide resin or the size thereof is excessively grown, whereby the crystal characteristic is strongly implemented, the flexibility or bending durability of the polymer itself is lowered, the haze value is rapidly increased and so the transparency can be lowered.

In addition, the present inventors have found through experiments that as the polyamide resin of the one embodiment satisfies the conditions in which an average particle size of individual crystals measured by a small-angle X-ray scattering apparatus is 8.0 nm or less and simultaneously a UV-cut slope (dT/dλ) measured for a specimen having a thickness of 45 μm or more and 55 μm or less according to ASTM E424 is 0.25 or more in the range of 10% to 80% transmittance, the characteristics of blocking the light of the wavelength of the external ultraviolet region and protecting the material inside the electronic equipment are strengthened, and it can secure at least an adequate level of mechanical properties and excellent transparency while realizing excellent UV shielding function when applied to the cover window film or the like, thereby completing the present invention.

Specifically, the polyamide resin may have a UV-cut slope (dT/dλ) measured for a specimen having a thickness of 45 μm or more and 55 μm or less, or 48 μm or more and 52 μm or less according to ASTM E424, of 0.25 or more, or 0.3 or more, or 0.35 or more, or 0.25 or more and 10 or less, or 0.25 or more and 8 or less, or 0.25 or more and 6 or less, or 0.3 or more and 10 or less, or 0.3 or more and 8 or less, or 0.3 or more and 6 or less, or 0.35 or more and 5.5 or less, or 0.35 or more and 5 or less, or 0.35 or more and 4.56 or less in the range of 10% to 80% transmittance.

The UV-cut slope (dT/dλ) of the polyamide resin may mean an instantaneous slope, that is, a differential coefficient, on the x-y graph where the x-axis is wavelength (λ) and the y-axis is transmittance.

As such, as the polyamide resin has a relatively high UV-cut slope, it can have colorless and transparent optical properties together with excellent UV shielding function.

In contrast, when the UV-cut slope (dT/dλ) of the polyamide resin, which is measured for a specimen having a thickness of 45 μm or more and 55 μm or less, or 48 μm or more and 52 μm or less according to ASTM E424, is excessively reduced to less than 0.25 in the range of 10% to 80% transmittance, it has a low UV-cut slope, which may lead to degradation of UV shielding function, etc.

Further, in this case, the UV-cut off wavelength (wavelength when transmittance is less than 1%) may be 350 nm to 390 nm.

The UV-cut slope of the polyamide resin can be confirmed through commonly known measuring methods and measuring devices. For example, a method of measuring the UV-cut off wavelength (λ) and UV-cut slope (dT/dλ) of the polyamide resin or the film obtained therefrom according to the ASTM E424 test method using a UV-Vis spectrophotometer (manufacturer: Shimadzu, model: UV2600) can be used.

More specifically, the polyamide resin may have an UV-cut slope (dT/dλ) measured for a specimen having a thickness of 45 μm or more and 55 μm or less, or 48 μm or more and 52 μm or less according to ASTM E424, of 0.25 or more, or 0.35 or more, or 0.25 or more and 2.0 or less, or 0.35 or more and 2.0 or less, or 0.36 or more and 0.68 or less at 80% transmittance.

Further, the polyamide resin may have an UV-cut slope (dT/dλ) measured for a specimen having a thickness of 45 μm or more and 55 μm or less, or 48 μm or more and 52 μm or less according to ASTM E424, of 2 or more, or 2.3 or more, or 2 or more and 5 or less, or 2.3 or more and 5 or less, or 2.4 or more and 3 or less, or 2.45 or more and 2.9 or less at 10% transmittance.

On the other hand, the polyamide resin can satisfy an average particle size of individual crystals of 8.0 nm or less as measured by a small-angle X-ray scattering apparatus. The polyamide resin may include a plurality of individual crystals. The average particle size of the individual crystals contained in the polyamide resin can be determined through the method for calculating the number average particle size which includes confirming the particle sizes of all the crystals contained in the polyamide resin and then dividing the sum of these particle sizes by the number of individual crystals.

The average particle size of the individual crystals can be measured through an analytical equipment by fitting a scattering pattern obtained by irradiating X-rays with energies of 10 KeV to 20 KeV, or 10 KeV to 14 KeV, or 16 KeV to 20 KeV in a small-angle X-ray scattering apparatus to a solid sphere model.

As for the X-rays to be irradiated, for example, a method of irradiating X-rays with energies of 10 KeV to 14 KeV and X-rays together with energies of 16 KeV to 20 KeV can be used.

The scattering pattern, which is the data obtained from the small-angle X-ray scattering apparatus, may be a result measured by irradiating X-rays with energies of 10 KeV to 20 KeV using the small-angle X-ray scattering apparatus at a temperature of 20° C. to 30° C. As a detector in the small-angle X-ray scattering apparatus, an imaging plate, a position-sensitive detector (PSPC), and the like can be used.

Subsequently, an average particle size analysis of the individual crystals may be performed through an analytical equipment that is separately installed inside or outside the small-angle X-ray scattering apparatus. An example of the small-angle X-ray scattering apparatus may be a PLS 9A beamline, and an example of the analytical equipment may be a NIST SANS package which is a computer program.

Specifically, the average particle size of the individual crystals can be determined through the calculation of computer program (NIST SANS package) for the diameter distribution curve of crystals which is obtained by fitting the shape of individual crystals contained in the sample to a solid sphere model, plotting the obtained wavenumber q (unit: $Å^{-1}$) and scattering intensity I (unit: a.u.), and convoluting the plot with a Schulz-Zimm distribution.

The crystals can be a group of individual crystals having a particle size of 0.1 nm to 15 nm, and the individual crystals contained in such group can have an average particle size of 8 nm or less. More specifically, 95%, or 99% of the individual crystals contained in the group may have a particle size of 8 nm or less. That is, as the majority of the individual crystals has a particle size of 8 nm or less, or 7 nm or less, or 0.1 nm to 8.0 nm, or 0.1 nm to 7 nm, or 1 nm to 8 nm, or 1 nm to 7 nm, or 3 nm to 8 nm, or 3 nm to 7 nm, or 5 nm to 6.8 nm, the average particle size of the individual crystals may also satisfy the above-mentioned range.

More specifically, the average particle size of the individual crystals measured by the small-angle X-ray scattering apparatus may be 8.0 nm or less, or 7 nm or less, or 0.1 nm to 8.0 nm, or 0.1 nm to 7 nm, or 1 nm to 8 nm, Or 1 nm to 7 nm, or 3 nm to 8 nm, or 3 nm to 7 nm, or 5 nm to 6.8 nm.

Specifically, when the polyamide resin sample is irradiated with X-rays using the small-angle X-ray scattering apparatus, the small-angle X-ray scattering pattern is secured through a detector. When analyzing this through an analytical equipment, it is possible to determine the average radius (Rc) of the individual crystals contained in the polyamide resin sample. Through this, finally, the average particle size of the individual crystals can be determined by calculating twice the average radius (Rc) of the individual crystals described above.

More specifically, with reference to the crystal structure of the polyamide resin of one embodiment described in FIG. 1 below, the polyamide resin is composed of amorphous polymer chains 3 present between individual crystals, together with a plurality of individual crystals 1, and a particle size 2 can be defined for the individual crystals.

Meanwhile, the individual crystals 1 may be formed by gathering polyamide resin chains in a bundle, as shown in FIG. 5. In particular, the length of the individual crystals can be grown through the overlap between the crystalline polymer blocks contained in the polyamide resin. It is difficult to specifically specify the shape of the overlapped individual crystals, but it can be seen that it has roughly a spherulite structure by three-dimensional growth, a lamella structure by two-dimensional growth, or an intermediate structure between three-dimensional and two-dimensional.

Preferably, the polyamide resin may have a dimensionality of the individual crystals measured by a small-angle X-ray scattering apparatus of 3.0 or more, or 3.0 to 4.0.

The dimensionality of the individual crystals of the polyamide resin can be measured through an analytical instrument by fitting a spherical scattering pattern obtained by irradiating X-rays with energies of 10 KeV to 20 KeV, or 10 KeV to 14 KeV, or 16 KeV to 20 KeV in a small-angle X-ray scattering apparatus to a solid sphere model. The small-angle X-ray scattering apparatus and the contents of the analysis thereon include the contents described above in the average particle size of the individual crystals.

Meanwhile, the polyamide resin may further include amorphous polymer chains present between the individual crystals having an average particle size of 8.0 nm or less. More specifically, with reference to the crystal structure of the polyamide resin of one embodiment described in FIG. 1 below, the polyamide resin may be composed of amorphous polymer chains 3 present between individual crystals 40 together with a plurality of individual crystals 1.

Due to the amorphous polymer chains, the growth of the average particle size of the individual crystals is suppressed, and the polyamide resin may satisfy an average particle size of individual crystals measured by a small-angle X-ray scattering apparatus of 8.0 nm or less.

In this case, the distance between the individual crystals having an average particle size of 8.0 nm or less may be 0.1 nm to 100 nm, or 1 nm to 100 nm, or 30 nm to 100 nm. The distance between individual crystals having an average particle size of 8.0 nm or less can also be measured by a small-angle X-ray scattering apparatus.

In the polyamide resin, examples of specific components of the individual crystals whose average particle size measured by a small-angle X-ray scattering apparatus is 8.0 nm or less are not particularly limited, and various aromatic amide repeating units used in the preparation of crystalline polyamide resins can be applied without limitation.

As an example of the component of the individual crystals whose average particle size measured by the small-angle X-ray scattering apparatus is 8.0 nm or less, a first aromatic polyamide repeating unit derived from a combination of a 1,4-aromatic diacyl compound and an aromatic diamine compound may be included. The polymer chains composed of the first aromatic amide repeating units may be gathered in a bundle to form individual crystals having an average particle size of 8.0 nm or less.

Specific examples of the 1,4-aromatic diacyl compound include terephthaloyl chloride or terephthalic acid. In addition, examples of the aromatic diamine monomer may include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

Preferably the 1,4-aromatic diacyl compound may include terephthaloyl chloride, or terephthalic acid, and the aromatic diamine compound may include 2,2'-bis(trifluoromethyl)-4,4'-biphenyldiamine.

More specifically, the individual crystals having an average particle size of 8.0 nm or less may include a first polyamide segment including a repeating unit represented by the following Chemical Formula 1, or a block comprised thereof.

[Chemical Formula 1]

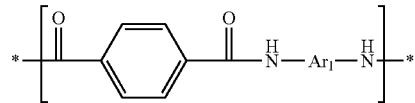

in Chemical Formula 1, $Ar_1$ is a substituted or unsubstituted arylene group having 6 to 20 carbon atoms, or a substituted or unsubstituted heteroarylene group having 2 to 20 carbon atoms.

In Chemical Formula 1, $Ar_1$ is an arylene group having 6 to 20 carbon atoms that is substituted with one or more substituents selected from the group consisting of an alkyl group, a haloalkyl group, and an amino group, and more preferably, it may be a 2,2'-bis(trifluoromethyl)-4,4'-biphenylene group.

More specifically, in Chemical Formula 1, $Ar_1$ may be a divalent organic functional group derived from an aromatic diamine monomer, and specific examples of the aromatic diamine monomer may include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, and 4,4'-diaminobenzanilide. More preferably, the aromatic diamine monomer may be 2,2'-bis(trifluoromethyl)-4,4'-biphenyldiamine (TFDB) or 2,2'-dimethyl-4,4'-diaminobenzidine.

The first polyamide segment may include a repeating unit represented by Chemical Formula 1, or a block composed of a repeating unit represented by Chemical Formula 1.

Specific examples of the repeating unit represented by Chemical Formula 1 include a repeating unit represented by the following Chemical Formula 1-1.

[Chemical Formula 1-1]

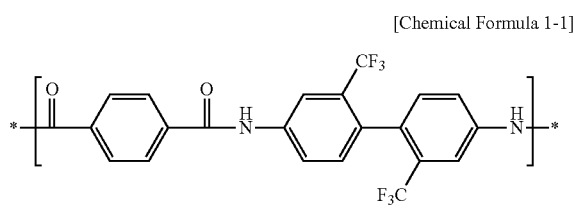

The repeating unit represented by Chemical Formula 1 is an amide repeating unit derived from a combination of a 1,4-aromatic diacyl compound and an aromatic diamine compound, specifically, an amide repeating unit formed by an amidation reaction of terephthaloyl chloride or terephthalic acid with an aromatic diamine monomer. Due to the linear molecular structure, the chain packing and alignment can be kept constant in the polymer, and the surface hardness and mechanical properties of the polyamide film can be improved.

Specific examples of the 1,4-aromatic diacyl compound include terephthaloyl chloride or terephthalic acid. In addition, examples of the aromatic diamine monomer may include at least one selected from the group consisting of 2,2'-bis(trifluoromethyl)-4,4'-biphenyldiamine), 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone), 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

Preferably the 1,4-aromatic diacyl compound may include terephthaloyl chloride, or terephthalic acid, and the aromatic diamine compound may include 2,2'-bis(trifluoromethyl)-4,4'-biphenyldiamine.

The first polyamide segment may have a number average molecular weight of 100 g/mol to 5000 g/mol, or 100 g/mol to 3000 g/mol, or 100 g/mol to 2500 g/mol, or 100 g/mol to 2450 g/mol. When the number average molecular weight of the first polyamide segment is increased by more than 5000 g/mol, the chains of the first polyamide segment become excessively long and so the crystallinity of the polyamide resin can be increased. As a result, it may have a high haze value and so it may be difficult to secure transparency. Examples of the measuring method of the number average molecular weight of the first polyamide segment is not limited, but for example, it can be confirmed through a small-angle X-ray scattering (SAXS) analysis.

The first polyamide segment may be represented by the following Chemical Formula 5.

[Chemical Formula 5]

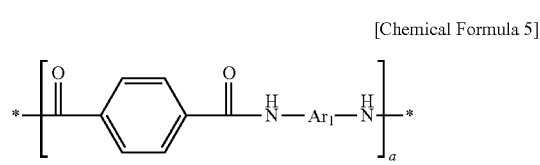

in Chemical Formula 5, $Ar_1$ is a substituted or unsubstituted arylene group having 6 to 20 carbon atoms, or a substituted or unsubstituted heteroarylene group having 2 to 20 carbon atoms, and a is an integer of 1 to 5. In Chemical Formula 5, when a is 1, the Formula 5 may be a repeating unit represented by Chemical Formula 1. In Chemical Formula 5, when a is 2 to 5, the Formula 5 may be a block composed of repeating units represented by Chemical Formula 1. In Chemical Formula 5, the details concerning $Ar_1$ includes those described above in Chemical Formula 1.

Based on the total repeating units contained in the polyamide resin, the ratio of the repeating units represented by Chemical Formula 1 may be 40 mol % to 95 mol %, 50 mol % to 95 mol %, or 60 mol % to 95 mol %, or 70 mol % to 95 mol %, or 50 mol % to 90 mol %, or 50 mol % to 85 mol %, or 60 mol % to 85 mol %, or 70 mol % to 85 mol %, or 80 mol % to 85 mol %, or 82 mol % to 85 mol %.

In this manner, the polyamide resin in which the repeating unit represented by Chemical Formula 1 is contained in the above-described content can ensure a sufficient level of molecular weight, thereby ensuring excellent mechanical properties.

Further, in the polyamide resin, examples of specific components of the amorphous polymer chains present between the individual crystals having an average particle size of 8.0 nm or less are not particularly limited, and various aromatic amide repeating units used in the preparation of amorphous polyamide resins can be applied without limitation.

Examples of an amorphous polymer chain component present between individual crystals whose average particle size measured by the small-angle X-ray scattering apparatus is 8.0 nm or less may include a second aromatic amide repeating units derived from a combination of a 1,2-aromatic diacyl compound and an aromatic diamine compound, or a third aromatic amide repeat unit derived from a combination of a 1,3-aromatic diacyl compound and an aromatic diamine compound, or mixtures thereof. The polymer chains composed of the second aromatic amide repeating unit or the third aromatic amide repeating unit as described above may realize amorphous characteristics.

Specific examples of the 1,2-aromatic diacyl compound include phthaloyl chloride or phthalic acid. In addition, specific examples of the 1,3-aromatic diacyl compound include isophthaloyl chloride or isophthalic acid. Examples of the aromatic diamine monomer include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

Preferably the 1,2-aromatic diacyl compound may include phthaloyl chloride, or phthalic acid, the 1,3-aromatic diacyl compound may include isophthaloyl chloride or isophthalic acid, and the aromatic diamine compound may include 2,2'-bis(trifluoromethyl)-4,4'-biphenyldiamine.

More specifically, the amorphous polymer chains present between the individual crystals having an average particle size of 8.0 nm or less including the first polyamide segment including a repeating unit represented by Chemical Formula 1 or a block composed thereof may include a second polyamide segment including a repeating unit represented by the following Chemical formula 2, or a block composed thereof.

[Chemical Formula 2]

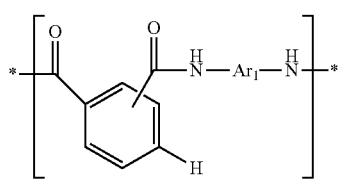

in Chemical Formula 2, $Ar_2$ is a substituted or unsubstituted arylene group having 6 to 20 carbon atoms, or a substituted or unsubstituted heteroarylene group having 2 to 20 carbon atoms.

In Chemical Formula 2, $Ar_2$ is an arylene group having 6 to 20 carbon atoms that is substituted with one or more substituents selected from the group consisting of an alkyl group, a haloalkyl group, and an amino group. More preferably, it may be a 2,2'-bis(trifluoromethyl)-4,4'-biphenylene group.

More specifically, in Chemical Formula 2, $Ar_2$ may be a divalent organic functional group derived from an aromatic diamine monomer. Specific examples of the aromatic diamine monomer include at least one selected from the group consisting of 2,2'-bis(trifluoromethyl)-4,4'-biphenyl-diamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4'-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, and 4,4'-diaminobenzanilide. More preferably, the aromatic diamine monomer may be 2,2'-bis(trifluoromethyl)-4,4'-biphenyl-diamine (TFDB) or 2,2'-dimethyl-4,4'-diaminobenzidine.

The second polyamide segment may include a repeating unit represented by Chemical Formula 2, or a block composed of the repeating unit represented by Chemical Formula 2.

More specifically, the repeating unit represented by Chemical Formula 2 may include one type of repeating unit selected from a repeating unit represented by the following Chemical Formula 2-1; or a repeating unit represented by Chemical Formula 2-2.

[Chemical Formula 2-1]

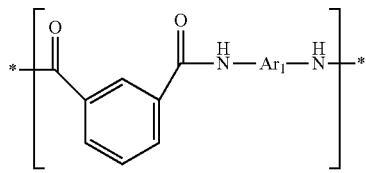

[Chemical Formula 2-2]

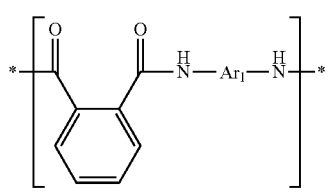

in Chemical Formulas 2-1 to 2-2, $Ar_2$ is a substituted or unsubstituted arylene group having 6 to 20 carbon atoms, or a substituted or unsubstituted heteroarylene group having 2 to 20 carbon atoms. The details concerning $Ar_2$ includes those described above in Chemical Formula 2.

The repeating unit represented by Chemical Formula 2-1 is a repeating unit formed by an amidation reaction of isophthaloyl chloride or isophthalic acid with an aromatic diamine monomer, and the repeating unit represented by Chemical Formula 2-2 is a repeating unit formed by an amidation reaction of phthaloyl chloride or phthalic acid with an aromatic diamine monomer.

Specific examples of the repeating unit represented by Chemical Formula 2-1 include a repeating unit represented by the following Chemical Formula 2-4.

[Chemical Formula 2-4]

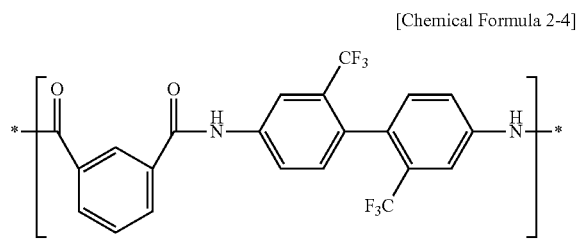

Specific examples of the repeating unit represented by Chemical Formula 2-2 include a repeating unit represented by the following Chemical Formula 2-5.

[Chemical Formula 2-5]

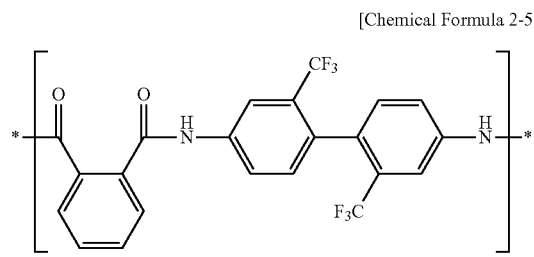

On the other hand, the second polyamide segment may be represented by the following Chemical Formula 6.

[Chemical Formula 6]

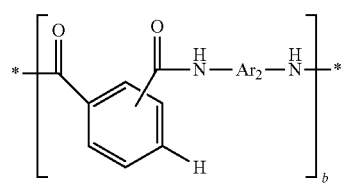

In Chemical Formula 6, $Ar_2$ is a substituted or unsubstituted arylene group having 6 to 20 carbon atoms, or a substituted or unsubstituted heteroarylene group having 2 to 20 carbon atoms, and b is an integer of 1 to 3 or 1 to 2. In Chemical Formula 6, when b is 1, the Formula 6 may be a repeating unit represented by Chemical Formula 2. In Chemical Formula 6, when b is 2 to 3, the Formula 6 may be a block composed of repeating units represented by Chemical Formula 2.

The repeating unit represented by Chemical Formula 2 is a repeating unit formed by an amidation reaction of isophthaloyl chloride, isophthalic acid or phthaloyl chloride, phthalic acid and an aromatic diamine monomer. Due to the curved molecular structure, it has the property of interfering with chain packing and alignment within the polymer, and it is possible to increase the amorphous region in the polyamide resin and thus improve the optical properties and the folding endurance of the polyamide film. In addition, as this is included in the polyamide resin together with the repeating unit represented by Chemical Formula 1, it is possible to increase the molecular weight of the polyamide resin.

Based on the total repeating units contained in the polyamide resin, the ratio of the repeating unit represented by Chemical Formula 2 may be 5 mol % to 60 mol %, or 5 mol % to 50 mol %, or 5 mol % to 40 mol %, or 5 mol % to 30 mol %, or 10 mol % to 50 mol %, or 15 mol % to 50 mol %, or 15 mol % to 40 mol %, or 15 mol % to 30 mol %, or 15 mol % to 20 mol %, or 15 mol % to 18 mol %.

As described above, the polyamide resin in which the repeating unit represented by Chemical Formula 2 is contained in the above-described content can suppress the length growth of the chains consisting of only the specific repeating unit represented by Chemical Formula 1 and thus lower the crystallinity of the resin. As a result, it is possible to have a low haze value and thus secure excellent transparency.

More specifically, based on the total repeating units contained in the polyamide resin, the content of the repeating unit represented by Chemical Formula 1 may be 60 mol % to 95 mol %, or 70 mol % to 95 mol %, or 50 mol % to 90 mol %, or 50 mol % to 85 mol %, or 60 mol % to 85 mol %, or 70 mol % to 85 mol %, or 80 mol % to 85 mol %, or 82 mol % to 85 mol %, and the content of the repeating unit represented by Chemical Formula 2 may be 5 mol % to 40 mol %, or 5 mol % to 30 mol %, or 10 mol % to 50 mol %, or 15 mol % to 50 mol %, or 15 mol % to 40 mol %, or 15 mol % to 30 mol %, or 15 mol % to 20 mol %, or 15 mol % to 18 mol %.

That is, the polyamide resin can increase the molar content of the repeating unit represented by Chemical Formula 1 and thus maximize the effect of improving the surface hardness and mechanical properties of the polyamide film according to the chain packing and alignment within the polymer due to the linear molecular structure of the repeating unit represented by Chemical Formula 1. In addition, although the repeating unit represented by Chemical Formula 2 has a relatively low molar content, it may suppress the length growth of the chains consisting of only the specific repeating unit represented by Chemical Formula 1, thereby lowering the crystallinity of the resin. As a result, it is possible to have a low haze value and thus secure excellent transparency.

On the other hand, the first polyamide segment and the second polyamide segment may form a main chain including an alternating repeating unit represented by the following Chemical Formula 3. That is, the first polyamide segment contained in the individual crystals whose average particle size measured by the small-angle X-ray scattering apparatus is 8.0 nm or less may form an alternating repeating unit represented by the following Chemical Formula 3 with the second polyamide segment contained in the amorphous polymer chain existing between the individual crystals.

As a result, the polyamide resin of one embodiment has a structure in which a plurality of individual crystals and amorphous polymer chains are repeated, as in the crystal structure shown in FIG. 1, and it is possible to suppress the continuous size growth of only individual crystals. Thereby, the individual crystals allow an average particle size measured by a small-angle X-ray scattering apparatus to reduce to 8.0 nm or less.

[Chemical Formula 3]

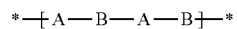

in Chemical Formula 3, A is the first polyamide segment, and B is the second polyamide segment.

Specifically, in the main chain of the polyamide resin, a first polyamide segment derived from terephthaloyl chloride or terephthalic acid and a second polyamide segment derived from isophthaloyl chloride, isophthalic acid or phthaloyl chloride, phthalic acid may alternately form a polymer chain as shown in Chemical Formula 3. That is, the second polyamide segment is positioned between the first polyamide segments, and may serve to suppress the growth of the length of the first polyamide segment.

The second polyamide segment is included in an amorphous polymer chain present between individual crystals having an average particle size of 8.0 nm or less, and the first polyamide segment is included in individual crystals having an average particle size of 8.0 nm or less. Therefore, in the polyamide resin, the amorphous polymer chain may be positioned between individual crystals having an average particle size of 8.0 nm or less, and may serve to suppress the growth of the size of the individual crystals. This can also be confirmed through the crystal structure shown in FIG. 1.

When the size growth of the individual crystals is suppressed in this manner, it is possible to remarkably lower the haze value of the polyamide resin while reducing crystal properties of the individual crystals, thereby achieving excellent transparency.

On the other hand, "in the main chain of the polyamide resin, a first polyamide segment derived from terephthaloyl chloride or terephthalic acid and a second polyamide segment derived from isophthaloyl chloride, isophthalic acid or phthaloyl chloride, phthalic acid may alternately form a polymer chain as shown in Chemical Formula 3" is considered to be due to the formation of a melt-kneaded complex in the preparation method of the polyamide resin of the present invention described hereinafter.

When explanation is made by enumerating concrete examples, the alternating repeating unit represented by Chemical Formula 3 may be a repeating unit represented by the following Chemical Formula 4.

[Chemical Formula 4]

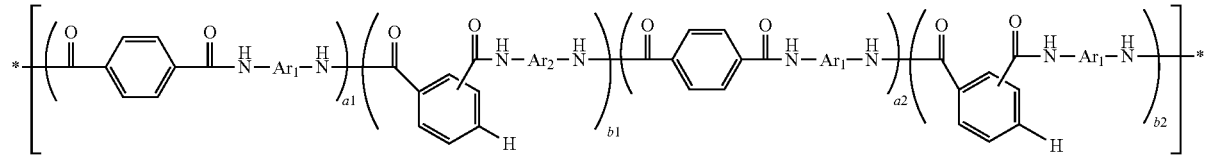

in Chemical Formula 4, $Ar_1$ and $Ar_2$ are each independently a substituted or unsubstituted arylene group having 6 to 20 carbon atoms, or a substituted or unsubstituted heteroarylene group having 2 to 20 carbon atoms, a1 and a2 are each independently an integer of 1 to 10, or 1 to 5, and b1 and b2 are each independently an integer of 1 to 5, or 1 to 3.

In Chemical Formula 4, the crystalline polymer block (derived from terephthaloyl chloride or terephthalic acid) having the number of repeating units of a1 or a2 may form individual crystals whose average particle size measured by the small-angle X-ray scattering apparatus is 8.0 nm or less. In addition, in Chemical Formula 4, the amorphous polymer block (derived from isophthaloyl chloride, isophthalic acid or phthaloyl chloride, phthalic acid) having the number of repeating units of b1 or b2 may form an amorphous polymer chain existing between individual crystals whose average particle size measured by a small-angle X-ray scattering apparatus is 8.0 nm or less.

That is, the polyamide resin may include a first polyamide segment including a repeating unit represented by Chemical Formula 1 or a block composed thereof; and a second polyamide segment including a repeating unit represented by Chemical Formula 2, or a block composed thereof, wherein the first polyamide segment and the second polyamide segment may form a main chain including an alternating repeating unit represented by Chemical Formula 3.

The present inventors have found through experiments that as the average particle size of the individual crystals is reduced to 8.0 nm or less as in the polyamide resin of one embodiment, it is possible to minimize the growth of the length of the polymer block (hereinafter, referred to as the first polyamide segment) consisting of repeating units derived from terephthaloyl chloride or terephthalic acid within the polyamide resin and lower the crystallinity of the polyamide resin, thus implementing a transparent polyamide resin. The present invention has been completed on the basis of such finding.

Specifically, in the main chain of the polyamide resin, crystalline polymer blocks derived from terephthaloyl chloride or terephthalic acid (hereinafter, referred to as first polyamide segment) and amorphous polymer blocks derived from isophthaloyl chloride, isophthalic acid or phthaloyl chloride, phthalic acid (hereinafter, referred to as second polyamide segment) may alternately form a polymer chain. That is, the second polyamide segment is positioned between the first polyamide segments, and may serve to suppress the growth of the length of the first polyamide segment.

In this case, the first polyamide segment is included in the individual crystals of the polyamide resin to express crystal properties, and the second polyamide segment is included in an amorphous polymer chain between the individual crystals to express amorphous properties.

Therefore, when the length growth of the first polyamide segment is suppressed, the average particle size of the individual crystals measured by a small-angle X-ray scattering apparatus is measured to be relatively small. Since the polyamide resin can remarkably reduce the haze value while reducing the crystal characteristics of the first polyamide segment, it is possible to achieve excellent transparency.

On the contrary, when the length growth suppression effect of the first polyamide segment by the second polyamide segment is reduced, and the length growth of the first polyamide segment proceeds excessively, the average particle size of the individual crystals measured by the small-angle X-ray scattering apparatus is measured to be relatively large, the polyamide resin may have poor transparency while increasing the crystal characteristics of the first polyamide segment and rapidly increasing the haze value.

And yet, the polyamide resin can have a sufficient level of weight average molecular weight, whereby a sufficient level of mechanical properties can also be achieved.

Meanwhile, the polyamide resin may have a degree of crystallinity of 20% or less, or 1% to 20%, as measured by a small-angle X-ray scattering apparatus. The degree of crystallinity of the polyamide resin can be measured through an analytical instrument by fitting a scattering pattern obtained by irradiating X-rays with energies of 10 KeV to 20 KeV, or 10 KeV to 14 KeV, or 16 KeV to 20 KeV in a small-angle X-ray scattering apparatus to a solid sphere model. The small-angle X-ray scattering apparatus and the analysis contents thereof include the contents described above in the average particle size of the individual crystals.

The weight average molecular weight of the polyamide resin may be 330000 g/mol or more, 420000 g/mol or more, or 500000 g/mol or more, or 330000 g/mol to 1000000 g/mol, or 420000 g/mol to 1000000 g/mol, or 500000 g/mol to 1000000 g/mol, or 420000 g/mol to 800000 g/mol, or 420000 g/mol to 600000 g/mol, or 450000 g/mol to 550000 g/mol.

The reason why the weight average molecular weight of the said polyamide resin is measured to be high is considered to be due to the formation of a melt-kneaded complex in the preparation method of the polyamide resin of another embodiment of the present invention described hereinafter. When the weight average molecular weight is reduced to less than 330,000 g/mol, the polyamide resin has a problem that mechanical properties such as flexibility and pencil hardness are lowered.

The polydispersity index of the polyamide resin may be 3.0 or less, or 2.5 or less, or 1.9 or less, or 1.5 to 1.95, or 1.5 to 1.9, or 1.6 to 1.9, or 1.8 to 1.9. Through such narrow range of polydispersity index, the polyamide resin can improve mechanical properties such as bending properties or hardness properties. When the polydispersity index of the polyamide resin becomes too wide by more than 3.0, there is a limit that it is difficult to improve the above-described mechanical properties to a sufficient level.

The haze of the polyamide resin measured according to ASTM D1003 may be 3.0% or less, or 1.5% or less, 1.00% or less, or 0.85% or less, or 0.10% to 3.0%, or 0.10% to 1.5%, or 0.10% to 1.00%, or 0.50% to 1.00%, or 0.80% to 1.00%, or 0.81% to 0.97%. When the haze of the polyamide resin measured according to ASTM D1003 is increased by more than 3.0%, the opacity is increased and thus it is difficult to secure a sufficient level of transparency. The polyamide resin may have a haze value measured for the specimen having the thickness of 45 μm or more and 55 μm or less according to ASTM D1003 of 3.0% or less.

Preferably, the polyamide resin satisfies the weight average molecular weight of 330000 g/mol or more, 420000 g/mol or more, or 500000 g/mol or more, or 330000 g/mol to 1000000 g/mol, or 420000 g/mol to 1000000 g/mol, or 500000 g/mol to 1000000 g/mol, or 420000 g/mol to 800000 g/mol, or 420000 g/mol to 600000 g/mol, or 450000 g/mol to 550000 g/mol, and simultaneously it may have the haze measured according to ASTM D1003 of 3.0% or less, or 1.5% or less, 1.00% or less, or 0.85% or less, or 0.50% to 3.0%, or 0.50% to 1.5%, or 0.50% to 1.00%, or 0.50% to 0.85%, or 0.70% to 0.85%, or 0.77% to 0.85%, or 0.80% to 0.85%.

The relative viscosity of the polyamide resin (measured according to ASTM D 2196) may be 45000 cps or more, or 60000 cps or more, or 45000 cps to 500000 cps, or 60000 cps to 500000 cps, or 70000 cps to 400000 cps, or 80000 cps to 300000 cps, or 100000 cps to 200000 cps, or 110000 cps to 174000 cps. When the relative viscosity of the polyamide resin (measured according to ASTM D 2196) is reduced to less than 45000 cps, there is a limit that in the film molding process using the polyamide resin, the molding processability is lowered and the efficiency of the molding process is lowered.

Meanwhile, according to another embodiment of the invention, there can be provided a polyamide resin in which with respect to a specimen having a thickness of 45 μm or more and 55 μm or less, a small-angle X-ray scattering function I(q) (where X-axis is the wavenumber q and Y-axis is the scattering intensity I) obtained by irradiating the polyamide resin with X-rays using a small-angle X-ray scattering apparatus satisfies Equation 1 and Equation 2.

The present inventors have found through experiments that the polyamide resin simultaneously satisfying Equation 1 and Equation 2 as described above not only has excellent mechanical properties possessed by a crystalline polymer but also the growth of individual crystals forming the crystal structure slows down to have a relatively small size, whereby it has a remarkably low level of haze value, yellowness, etc., and additionally can have high flexibility and bending durability, thereby completing the present invention.

Unlike this, when the polyamide resin does not satisfy any one of Equation 1 and Equation 2, the ratio occupied by the portion having crystallinity in the polyamide resin or the size thereof is excessively grown, whereby the crystal characteristic is strongly implemented, the flexibility or bending durability of the polymer itself may be lowered, the haze value is rapidly increased and thus the transparency can be lowered.

Specifically, the polyamide resin may satisfy Equation 1 and Equation 2 simultaneously. The polyamide resin can satisfy both Equation 1 and Equation 2. When any one of Equation 1 and Equation 2 is not satisfied, it is different from the polyamide resin of the other embodiment, and it is difficult to have the characteristics of the polyamide resin of the other embodiment as described in Table 2 below.

The small-angle X-ray scattering function I(q) obtained using the small-angle X-ray scattering apparatus may be the result measured for a specimen having a thickness of 45 μm or more and 55 μm or less, or 48 μm or more and 52 μm or less, or 49 μm or more and 51 μm or less, or 50 μm. The specimen may be a polyamide resin film that is adjusted to have a thickness of 45 μm or more and 55 μm or less, or 48 μm or more and 52 μm or less, or 49 μm or more and 51 μm or less, or 50 μm with respect to the polyamide resin film having various thicknesses, e.g., 0.01 μm to 1000 μm, produced using a polyamide resin. More specifically, the specimen may be a polyhedral film satisfying the dimension of 1 cm in width*1 cm in length and the above-mentioned thickness.

The small-angle X-ray scattering function I(q) obtained using the small-angle X-ray scattering apparatus can be measured through an analytical equipment by fitting a scattering pattern obtained by irradiating a polyamide resin or a polymer film obtained therefrom with X-rays with energies of 10 KeV to 20 KeV, or 10 KeV to 14 KeV, or 16 KeV to 20 KeV in a small-angle X-ray scattering apparatus to a solid sphere model.

An example of the small angle X-ray scattering apparatus may be u-SAXS beam-line 9A, and an example of the analytical equipment may be a NIST SANS package, which is a computer program.

As the X-rays to be irradiated, for example, a method of irradiating X-rays with energies of 10 KeV to 14 KeV and X-rays together with energies of 16 KeV to 20 KeV can be used. Preferably, the X-ray energy can be distinguished by a method of adjusting the distance between an X-ray irradiation apparatus and a sample. Specifically, X-rays with energies of 10 KeV to 14 KeV may have a distance between the X-ray irradiation apparatus and the sample of 5 m to 10 m and X-rays with energies of 16 KeV to 20 KeV may have a distance between the X-ray irradiation apparatus and the sample of 1 m to 4 m.

In this case, data obtained by X-rays having an energy of 10 KeV to 14 KeV and data obtained by X-rays having an energy of 16 KeV to 20 KeV can be merged and used. An example of devices for merging two data may be a NIST SANS data reduction package.

The small-angle X-ray scattering function I(q), which is the data obtained from the small-angle X-ray scattering apparatus, may be the result measured by irradiating X-rays of 10 KeV to 20 KeV energy using the small-angle X-ray scattering apparatus at a temperature of 20° C. to 30° C. As the detector in the small-angle X-ray scattering apparatus, an image plate, a position-sensitive detector (PSPC), a 2D CCD detector (manufactured by Rayonix SX165), and the like can be used.

When a 2D CCD Detector is used, a two-dimensional image obtained through the 2D CCD detector can be averaged into a circle based on the beam stop and converted into a one-dimensional image.

In the case of using the NIST SANS package, which is a computer program, a graph of the function I(q) (wavenumber range of 0.0024 Å$^{-1}$ to 0.5 Å$^{-1}$) whose X axis is the wavenumber q (unit: Å$^{-1}$), and Y-axis is the scattering intensity I (unit: a.u.) can be obtained using P. Grady's Excel program with respect to the one-dimensional image data obtained above.

Equation 1 means that the second derivative of I(q) in the range where the wavenumber q is 0.003 Å$^{-1}$ or more and 0.03 Å$^{-1}$ or less with respect to the small angle X-ray scattering function I(q) is positive. In general, when the second derivative of a function is positive, it means that the function is convex downward. That is, when the polyamide resin satisfies Equation 1, it means that the small-angle X-ray scattering function I(q) of the polyamide resin is convex downward in the range where the wavenumber q is 0.003 Å$^{-1}$ or more and 0.03 Å$^{-1}$ or less.

More specifically, referring to FIG. 4, it can be confirmed that the small-angle X-ray scattering function I(q) of the polyamide resin according to examples of the present invention is convex downward in the range where the wavenumber q is 0.003 Å$^{-1}$ or more and 0.03 Å$^{-1}$ or less, whereas the small-angle X-ray scattering function I(q) of the polyamide resin according to Comparative Example 2 of the present invention is convex upward in the range where the wavenumber q is 0.003 Å$^{-1}$ or more and 0.03 Å$^{-1}$ or less.

Equation 2 means that with respect to the small-angle X-ray scattering function I(q), the scattering intensity of I(q) is 1 a.u. or more (I(q)≥1 a.u.), or 1 a.u. or more and 100 a.u. or less (1 a.u.≤I(q)≤100 a.u.) in the range where the wavenumber q is 0.08 Å$^{-1}$ or more (q≥0.08 Å$^{-1}$), or 0.08 Å$^{-1}$ or more and 0.13 Å$^{-1}$ or less (0.08 Å$^{-1}$≤q≤0.13 Å$^{-1}$).

More specifically, referring to FIG. 4, it can be confirmed that in the small angle X-ray scattering function I(q), the polyamide resin of the examples of the present invention has a value of approximately 10 a.u. in the range where the wavenumber (q) is 0.08 Å$^{-1}$ or more, whereas the polyamide resin of Comparative Example 1 has a value of approximately 0.01 a.u. in the range where the wavenumber (q) is 0.08 Å$^{-1}$ or more, and the polyamide resin of Comparative Example 2 has a value of approximately 0.1 a.u. in the range where the wavenumber (q) is 0.08 Å$^{-1}$ or more.

Therefore, the polyamide resin of another embodiment has a form in which the small-angle X-ray scattering function I(q) is convex upward in the range where the wavenumber q is 0.003 Å$^{-1}$ or more and 0.03 Å$^{-1}$ or less, and simultaneously it has a high intensity of 1 a.u. or more in the range where the wavenumber (q) is 0.08 Å$^{-1}$ or more. Thereby, even while having excellent mechanical properties, the growth of the individual crystals forming the crystal structure is slowed down to have a relatively small size, thereby having a significantly low level of haze value and yellowness, and additionally, it is possible to have high flexibility and bending durability.

Meanwhile, the polyamide resin may further satisfy the following Equation 3 for a specimen having a thickness of 45 µm or more and 55 µm or less.

$$I(0.003 \text{ Å}^{-1}) \geq 1000 \text{ a.u.} \quad \text{[Equation 3]}$$

That is, the polyamide resin has a scattering intensity of 1000 a.u. or more, or 1000 a.u. or more and 10000 a.u. or less, or 5000 a.u. or more and 10000 a.u. or less at a point where the wavenumber q is 0.003 Å-1 in a small-angle X-ray scattering function I(q) obtained using a small-angle X-ray scattering apparatus.

The polyamide resin of another embodiment has a high intensity that the small-angle X-ray scattering function I(q) is 1000 a.u. at the point where the wavenumber(q) is 0.003 Å$^{-1}$. Thereby, even while having excellent mechanical properties, the growth of the individual crystals forming the crystal structure is slowed down to have a relatively small size, thereby having a significantly low level of haze value and yellowness, and additionally, it is possible to have high flexibility and bending durability.

In addition, the polyamide resin may further satisfy the following Equation 4 for a specimen having a thickness of 45 µm or more and 55 µm or less.

$$dI(q)/dq < 0 \quad \text{[Equation 4]}$$

in Equation 4, 0.003 Å$^{-1}$ ≤ q ≤ 0.03 Å$^{-1}$.

Equation 4 means that with respect to the small angle X-ray scattering function I(q), the first derivative of I(q) in the range where the wavenumber q is 0.003 Å$^{-1}$ or more and 0.03 Å$^{-1}$ or less is negative. In general, when the first derivative of a function is negative, it means that the slope of the tangent is negative. That is, when the polyamide resin satisfies Equation 4, it may mean that in the small-angle X-ray scattering function I(q) of the polyamide resin, the slope of the tangent is negative in the range where the wavenumber q is 0.003 Å$^{-1}$ or more and 0.03 Å$^{-1}$ or less.

Further, the polyamide resin may further satisfy the following Equation 5 for a specimen having a thickness of 45 µm or more and 55 µm or less.

$$100 \leq I(0.003 \text{ Å}^{-1})/I(0.08 \text{ Å}^{-1}) \leq 1000. \quad \text{[Equation 5]}$$

Equation 5 means that with respect to the small angle X-ray scattering function I(q), the value obtained by dividing the scattering intensity I (0.003 Å$^{-1}$) at the wavenumber (q) of 0.003 Å$^{-1}$ by the scattering intensity I (0.08 Å$^{-1}$) at the wavenumber (q) of 0.08 Å$^{-1}$ is 100 or more and 1000 or less. More specifically, I (0.003 Å$^{-1}$)/I(0.08 Å$^{-1}$) in Equation 5 may be 100 or more and 1000 or less, 500 or more and 1000 or less, or 700 or more and 900 or less.

In the polyamide resin of the other embodiment, in the small-angle X-ray scattering function I(q), the ratio of the scattering intensity I (0.003 Å$^{-1}$) at the wavenumber(q) of 0.003 Å$^{-1}$ to the scattering intensity I (0.08 Å$^{-1}$) at the wavenumber(q) of 0.08 Å$^{-1}$ is relatively small. Thereby, even while having excellent mechanical properties, the growth of the individual crystals forming the crystal structure is slowed down to have a relatively small size, thereby having a significantly low level of haze value and yellowness, and additionally, it is possible to have high flexibility and bending durability.

Specific examples of the polyamide resin are not particularly limited, but preferably, the aromatic amide repeating unit derived from a combination of an aromatic diacyl compound and an aromatic diamine compound may be contained.

More specifically, the aromatic amide repeating unit may include one or more repeating units selected from the group consisting of a first aromatic amide repeating unit derived from a combination of a 1,4-aromatic diacyl compound and an aromatic diamine compound; a second aromatic amide repeating unit derived from a combination of a 1,2-aromatic diacyl compound and an aromatic diamine compound; and a third aromatic amide repeating unit derived from a combination of a 1,3-aromatic diacyl compound and an aromatic diamine compound.

That is, the aromatic amide repeating unit may include one type of the first aromatic amide repeating unit derived from a combination of a 1,4-aromatic diacyl compound and an aromatic diamine compound, one type of the second aromatic amide repeating unit derived from a combination of a 1,2-aromatic diacyl compound and an aromatic diamine compound, one type of the third aromatic amide repeating unit derived from a combination of a 1,3-aromatic diacyl compound and an aromatic diamine compound, or mixtures of two or more thereof.

More preferably, the aromatic amide repeating unit may include a first aromatic amide repeating unit derived from a combination of a 1,4-aromatic diacyl compound and an aromatic diamine compound, together with one or more repeating units selected from the group consisting of a second aromatic amide repeating unit derived from a combination of the 1,2-aromatic diacyl compound and the aromatic diamine compound; and a third aromatic amide repeating units derived from a combination of a 1,3-aromatic diacyl compound and an aromatic diamine compound.

That is, it may include a second aromatic amide repeating unit derived from a combination of the 1,2-aromatic diacyl compound and the aromatic diamine compound and a first aromatic amide repeating unit derived from a combination of the 1,4-aromatic diacyl compound and the aromatic diamine compound, or include a third aromatic amide repeating unit derived from a combination of the 1,3-aromatic diacyl compound and the aromatic diamine compound and a first aromatic amide repeating unit derived from a combination of the 1,4-aromatic diacyl compound and the aromatic diamine compound, or include a second aromatic amide repeating unit derived from a combination of the 1,2-aromatic diacyl compound and the aromatic diamine compound, a third aromatic amide repeating unit derived from a combination of the 1,3-aromatic diacyl compound and the aromatic diamine compound, and a first aromatic amide repeating unit derived from a combination of the 1,4-aromatic diacyl compound and the aromatic diamine compound.

Specific examples of the 1,4-aromatic diacyl compound include terephthaloyl chloride or terephthalic acid. In addition, examples of the aromatic diamine monomer include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

Preferably the 1,4-aromatic diacyl compound may include terephthaloyl chloride, or terephthalic acid, and the aromatic diamine compound may include 2,2'-bis(trifluoromethyl)-4,4'-biphenyldiamine.

Specific examples of the 1,2-aromatic diacyl compound include phthaloyl chloride or phthalic acid. In addition, specific examples of the 1,3-aromatic diacyl compound include isophthaloyl chloride or isophthalic acid. Examples of the aromatic diamine monomers include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

Preferably the 1,2-aromatic diacyl compound may include phthaloyl chloride, or phthalic acid, the 1,3-aromatic diacyl compound may include isophthaloyl chloride or isophthalic acid, and the aromatic diamine compound may include 2,2'-bis(trifluoromethyl)-4,4'-biphenyldiamine.

More specifically, the polyamide resin may include a first polyamide segment including a repeating unit represented by the following Chemical Formula 1, or a block comprised thereof.

[Chemical Formula 1]

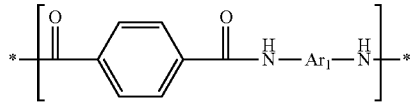

in Chemical Formula 1, $Ar_1$ is a substituted or unsubstituted arylene group having 6 to 20 carbon atoms, or a substituted or unsubstituted heteroarylene group having 2 to 20 carbon atoms.

In Chemical Formula 1, $Ar_1$ is an arylene group having 6 to 20 carbon atoms that is substituted with one or more substituents selected from the group consisting of an alkyl group, a haloalkyl group, and an amino group, and more preferably, it may be a 2,2'-bis(trifluoromethyl)-4,4'-biphenylene group.

More specifically, in Chemical Formula 1, $Ar_1$ may be a divalent organic functional group derived from an aromatic diamine monomer, and specific examples of the aromatic diamine monomer may include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, and 4,4'-diaminobenzanilide. The aromatic diamine monomer may be 2,2'-bis(trifluoromethyl)-4,4'-biphenyldiamine (TFDB) or 2,2'-dimethyl-4,4'-diaminobenzidine.

The first polyamide segment may include a repeating unit represented by Chemical Formula 1 or a block composed of a repeating unit represented by Chemical Formula 1.

Specific examples of the repeating unit represented by Chemical Formula 1 include a repeating unit represented by the following Chemical Formula 1-1.

[Chemical Formula 1-1]

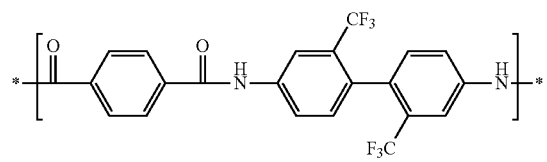

The repeating unit represented by Chemical Formula 1 is an amide repeating unit derived from a combination of a 1,4-aromatic diacyl compound and an aromatic diamine compound, specifically, an amide repeating unit formed by an amidation reaction of terephthaloyl chloride or terephthalic acid with an aromatic diamine monomer. Due to the linear molecular structure, the chain packing and alignment can be kept constant in the polymer, and the surface hardness and mechanical properties of the polyamide film can be improved.

Specific examples of the 1,4-aromatic diacyl compound include terephthaloyl chloride or terephthalic acid. In addition, examples of the aromatic diamine monomer may include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

Preferably the 1,4-aromatic diacyl compound may include terephthaloyl chloride, or terephthalic acid, and the aromatic diamine compound may include 2,2'-bis(trifluoromethyl)-4,4'-biphenyldiamine.

The first polyamide segment may have a number average molecular weight of 100 g/mol or more and 5000 g/mol or less, or 100 g/mol or more and 3000 g/mol or less, or 100 g/mol or more and 2500 g/mol or less, or 100 g/mol or more and 2450 g/mol or less. When the number average molecular weight of the first polyamide segment is increased by more than 5000 g/mol, the chains of the first polyamide segment become excessively long and so the crystallinity of the polyamide resin can be increased. As a result, it may have a high haze value and it may be difficult to secure transparency. Examples of the measuring method of the number average molecular weight of the first polyamide segment is not limited, but for example, it can be confirmed through a small-angle X-ray scattering (SAXS) analysis.

The first polyamide segment may be represented by the following Chemical Formula 5.

[Chemical Formula 5]

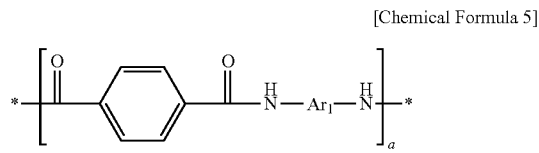

in Chemical Formula 5, $Ar_1$ is a substituted or unsubstituted arylene group having 6 to 20 carbon atoms, or a substituted or unsubstituted heteroarylene group having 2 to 20 carbon atoms, and a is an integer of 1 to 5. In Chemical Formula 5, when a is 1, the Formula 5 may be a repeating unit represented by Chemical Formula 1. In Chemical Formula 5, when a is 2 to 5, the Formula 5 may be a block composed of repeating units represented by Chemical Formula 1. In Chemical Formula 5, the details concerning $Ar_1$ includes those described above in Chemical Formula 1.

Based on the total repeating units contained in the polyamide resin, the ratio of the repeating units represented by Chemical Formula 1 may be 40 mol % to 95 mol %, 50 mol % to 95 mol %, or 60 mol % to 95 mol %, or 70 mol % to 95 mol %, or 50 mol % to 90 mol %, or 50 mol % to 85 mol %, or 60 mol % to 85 mol %, or 70 mol % to 85 mol %, or 80 mol % to 85 mol %, or 82 mol % to 85 mol %.

In this manner, the polyamide resin in which the repeating unit represented by the chemical formula 1 is contained in the above-described content can ensure a sufficient level of molecular weight, thereby ensuring excellent mechanical properties.

In addition, the polyamide resin may further include a second polyamide segment including a repeating unit represented by the following Chemical Formula 2, or a block composed thereof, in addition to the first polyamide segment containing a repeating unit represented by Chemical Formula 1, or a block composed thereof.

The repeating unit represented by Formula 2 may include an amide repeating unit derived from a combination of a 1,3-aromatic diacyl compound and an aromatic diamine compound, or a repeating unit derived from a combination of a 1,2-aromatic diacyl compound and an aromatic diamine compound, or mixtures thereof.

[Chemical Formula 2]

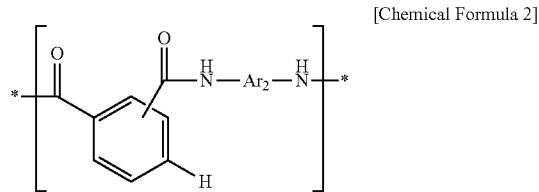

in Chemical Formula 2, $Ar_2$ is a substituted or unsubstituted arylene group having 6 to 20 carbon atoms, or a substituted or unsubstituted heteroarylene group having 2 to 20 carbon atoms.

In Chemical Formula 2, $Ar_2$ is an arylene group having 6 to 20 carbon atoms that is substituted with one or more substituents selected from the group consisting of an alkyl group, a haloalkyl group, and an amino group. More preferably, it may be a 2,2'-bis(trifluoromethyl)-4,4'-biphenylene group.

More specifically, in Chemical Formula 2, $Ar_2$ may be a divalent organic functional group derived from an aromatic diamine monomer. Specific examples of the aromatic diamine monomer include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine), 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene), and 4,4'-diaminobenzanilide. More preferably, the aromatic diamine monomer is 2,2'-bis(trifluoromethyl)-4,4'-biphenyldiamine (TFDB) or 2,2'-dimethyl-4,4'-diaminobenzidine.

The second polyamide segment may include a repeating unit represented by Chemical Formula 2, or a block composed of the repeating unit represented by Chemical Formula 2.

More specifically, the repeating unit represented by Chemical Formula 2 may include one type of repeating unit selected from a repeating unit represented by the following Chemical Formula 2-1; or a repeating unit represented by Chemical Formula 2-2.

[Chemical Formula 2-1]

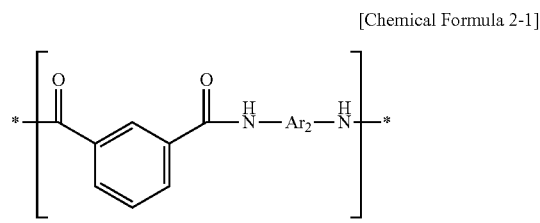

[Chemical Formula 2-2]

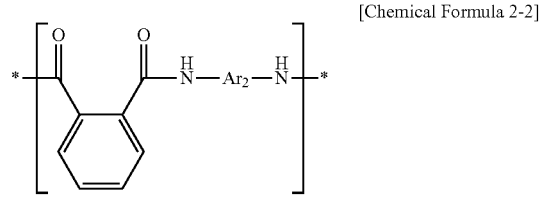

in Chemical Formulas 2-1 to 2-2, $Ar_2$ is a substituted or unsubstituted arylene group having 6 to 20 carbon atoms, or a substituted or unsubstituted heteroarylene group having 2 to 20 carbon atoms. The detailed description of $Ar_2$ includes the contents described above in Chemical Formula 2.

The repeating unit represented by Chemical Formula 2-1 is an amide repeating unit derived from the combination of a 1,3-aromatic diacyl compound and an aromatic diamine compound, specifically, it is a repeating unit formed by an amidation reaction of isophthaloyl chloride or isophthalic acid with an aromatic diamine monomer, and the repeating unit represented by Chemical Formula 2-2 is an amide repeating unit derived from the combination of a 1,2-aromatic diacyl compound and an aromatic diamine compound, specifically, it is a repeating unit formed by an amidation reaction of phthaloyl chloride or phthalic acid with an aromatic diamine monomer.

Specific examples of the 1,2-aromatic diacyl compound include phthaloyl chloride or phthalic acid. In addition, specific examples of the 1,3-aromatic diacyl compound include isophthaloyl chloride or isophthalic acid. Examples of the aromatic diamine monomer include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

Preferably, the 1,2-aromatic diacyl compound may include phthaloyl chloride, or phthalic acid, the 1,3-aromatic diacyl compound may include isophthaloyl chloride or isophthalic acid, and the aromatic diamine compound may include 2,2'-bis(trifluoromethyl)-4,4'-biphenyldiamine.

Specific examples of the repeating unit represented by Chemical Formula 2-1 include a repeating unit represented by the following Chemical Formula 2-4.

[Chemical Formula 2-4]

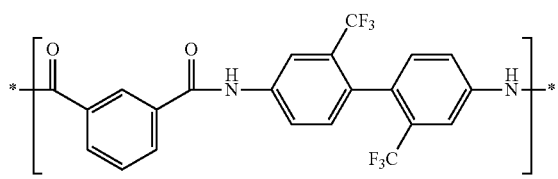

Specific examples of the repeating unit represented by Chemical Formula 2-2 include a repeating unit represented by the following Chemical Formula 2-5.

[Chemical Formula 2-5]

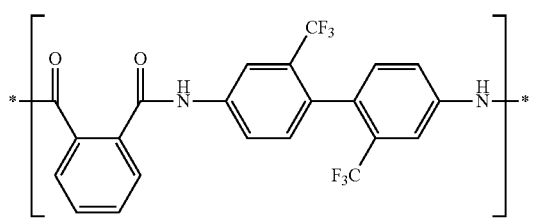

On the other hand, the second polyamide segment may be represented by the following Chemical Formula 6.

[Chemical Formula 6]

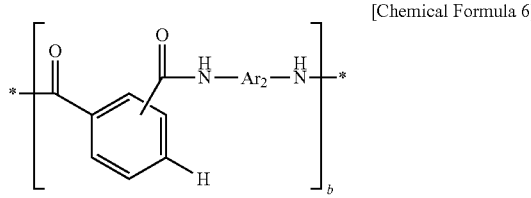

In Chemical Formula 6, $Ar_2$ is a substituted or unsubstituted arylene group having 6 to 20 carbon atoms, or a substituted or unsubstituted heteroarylene group having 2 to 20 carbon atoms, and b is an integer of 1 to 3 or 1 to 2. In Chemical Formula 6, when b is 1, the Formula 6 may be a repeating unit represented by Chemical Formula 2. In Chemical Formula 6, when b is 2 to 3, the Formula 6 may be a block composed of repeating units represented by Chemical Formula 2.

The repeating unit represented by Chemical Formula 2 is a repeating unit formed by an amidation reaction of isophthaloyl chloride, isophthalic acid or phthaloyl chloride, phthalic acid and an aromatic diamine monomer. Due to the curved molecular structure, it has the property of interfering with chain packing and alignment within the polymer, and it is possible to increase the amorphous region in the polyamide resin and thus improve the optical properties and the folding endurance of the polyamide film. In addition, as this is included in the polyamide resin together with the repeating unit represented by Chemical Formula 1, it is possible to increase the molecular weight of the polyamide resin.

Based on the total repeating units contained in the polyamide resin, the ratio of the repeating unit represented by Chemical Formula 2 may be 5 mol % to 60 mol %, or 5 mol % to 50 mol %, or 5 mol % to 40 mol %, or 5 mol % to 30 mol %, or 10 mol % to 50 mol %, or 15 mol % to 50 mol %, or 15 mol % to 40 mol %, or 15 mol % to 30 mol %, or 15 mol % to 20 mol %, or 15 mol % to 18 mol %.

As described above, the polyamide resin in which the repeating unit represented by Chemical Formula 2 is contained in the above-described content can suppress the growth of the length of the chains consisting of only the specific repeating unit represented by Chemical Formula 1 and thus lower the crystallinity of the resin. As a result, it is possible to have a low haze value and thus secure excellent transparency.

More specifically, based on the total repeating units contained in the polyamide resin, the content of the repeating unit represented by Chemical Formula 1 may be 60 mol % to 95 mol %, or 70 mol % to 95 mol %, or 50 mol % to 90 mol %, or 50 mol % to 85 mol %, or 60 mol % to 85 mol %, or 70 mol % to 85 mol %, or 80 mol % to 85 mol %, or 82 mol % to 85 mol %, and the content of the repeating unit represented by Chemical Formula 2 may be 5 mol % to 40 mol %, or 5 mol % to 30 mol %, or 10 mol % to 50 mol %, or 15 mol % to 50 mol %, or 15 mol % to 40 mol %, or 15 mol % to 30 mol %, or 15 mol % to 20 mol %, or 15 mol % to 18 mol %.

That is, the polyamide resin can increase the molar content of the repeating unit represented by Chemical Formula 1 and thus maximize the effect of improving the surface hardness and mechanical properties of the polyamide film according to the chain packing and alignment within the polymer due to the linear molecular structure of the repeating unit represented by Chemical Formula 1. In addition, although the repeating unit represented by Chemical Formula 2 has a relatively low molar content, it may suppress the length growth of the chain consisting of only the specific repeating unit represented by Chemical Formula 1, thereby lowering the crystallinity of the resin. As a result, it is possible to have a low haze value and thus secure excellent transparency.

On the other hand, the first polyamide segment and the second polyamide segment may form a main chain including an alternating repeating unit represented by the following Chemical Formula 3.

[Chemical Formula 3]

$$*+\!\!-\!\!A\!\!-\!\!B\!\!-\!\!A\!\!-\!\!B\!\!-\!\!\!+\!\!*$$

in Chemical Formula 3, A is the first polyamide segment, and B is the second polyamide segment.

Specifically, in the main chain of the polyamide resin, a first polyamide segment including an amide repeating unit derived from a combination of a 1,4-aromatic diacyl compound and an aromatic diamine compound, and a second polyamide segment including an amide repeating unit derived from a combination of a 1,3-aromatic diacyl compound and an aromatic diamine compound, or an amide repeating unit derived from a combination of a 1,2-aromatic diacyl compound and an aromatic diamine compound may alternately form a polymer chain as shown in Chemical Formula 3. That is, the second polyamide segment is positioned between the first polyamide segments, and may serve to suppress the growth of the length of the first polyamide segment.

In this manner, when the growth of the length of the first polyamide segment is suppressed, the haze value of the polyamide resin can be remarkably lowered while the crystal properties are reduced, thereby achieving excellent transparency.

On the other hand, "in the main chain of the polyamide resin, a first polyamide segment derived from terephthaloyl chloride or terephthalic acid and a second polyamide segment derived from isophthaloyl chloride, isophthalic acid or phthaloyl chloride, phthalic acid may alternately form a polymer chain as shown in Chemical Formula 3" is considered to be due to the formation of a melt-kneaded complex in the preparation method of the polyamide resin of the present invention described hereinafter.

When explanation is made by enumerating concrete examples, the alternating repeating unit represented by Chemical Formula 3 may be a repeating unit represented by the following Chemical Formula 4.

chloride, phthalic acid (hereinafter, the second polyamide segment) may alternately form a polymer chain. That is, the second polyamide segment is positioned between the first polyamide segments, and may serve to suppress the growth of the length of the first polyamide segment.

In this case, the first polyamide segment is included in the individual crystals of the polyamide resin to express crystal properties, and the second polyamide segment is included in an amorphous polymer chain between the individual crystals to express amorphous properties.

Therefore, when the length growth of the first polyamide segment is suppressed, the polyamide resin can remarkably reduce the haze value while reducing the crystal characteristics of the first polyamide segment, and therefore, it is possible to achieve excellent transparency.

On the contrary, when the length growth suppression effect of the first polyamide segment by the second polyamide segment is reduced, and the length growth of the first polyamide segment proceeds excessively, the polyamide resin may have poor transparency while increasing the crystal characteristics of the first polyamide segment and rapidly increasing the haze value.

And yet, the polyamide resin can have a sufficient level of weight average molecular weight, whereby a sufficient level of mechanical properties can also be achieved.

The polyamide resin may have a weight average molecular weight of 330000 g/mol or more, 420000 g/mol or more, or 500000 g/mol or more, or 330000 g/mol to 1000000 g/mol, or 420000 g/mol to 1000000 g/mol, or 500000 g/mol to 1000000 g/mol, or 420000 g/mol to 800000 g/mol, or 420000 g/mol to 600000 g/mol, or 450000 g/mol to 550000 g/mol.

The reason why the weight average molecular weight of the polyamide resin is measured to be high is considered to

[Chemical Formula 4]

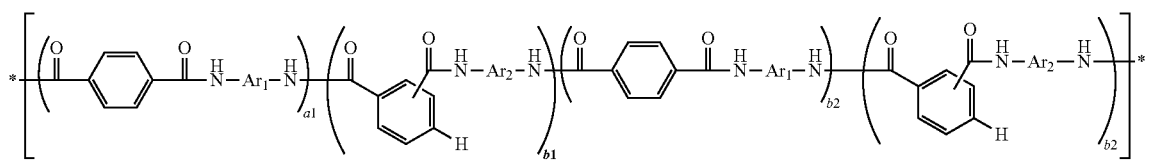

in Chemical Formula 4, $Ar_1$ and $Ar_2$ are each independently a substituted or unsubstituted arylene group having 6 to 20 carbon atoms, or a substituted or unsubstituted heteroarylene group having 2 to 20 carbon atoms, a1 and a2 are the same as or different from each other and are each independently an integer of 1 to 10, or 1 to 5, and b1 and b2 are the same as or different from each other and are each independently an integer of 1 to 5, or 1 to 3.

That is, the polyamide resin may include a first polyamide segment including a repeating unit represented by Chemical Formula 1 or a block composed thereof; and a second polyamide segment including a repeating unit represented by Chemical Formula 2, or a block composed thereof, wherein the first polyamide segment and the second polyamide segment may form a main chain including an alternating repeating unit represented by Chemical Formula 3.

Specifically, in the main chain of the polyamide resin, crystalline polymer blocks derived from terephthaloyl chloride or terephthalic acid (hereinafter, referred to as the first polyamide segment) and amorphous polymer block derived from isophthaloyl chloride, isophthalic acid or phthaloyl be due to the formation of a melt-kneaded complex in the preparation method of the polyamide resin of another embodiment of the present invention described hereinafter. When the weight average molecular weight is reduced to less than 330,000 g/mol, the polyamide resin has a problem that mechanical properties such as flexibility and pencil hardness are lowered.

The polyamide resin may have a polydispersity index of 3.0 or less, or 2.9 or less, or 2.8 or less, or 1.5 to 3.0, or 1.5 to 2.9, or 1.6 to 2.8, or 1.8 to 2.8. Through such narrow range of polydispersity index, the polyamide resin can improve mechanical properties such as bending properties or hardness properties. When the polydispersity index of the polyamide resin becomes too wide by more than 3.0, there is a limit that it is difficult to improve the above-described mechanical properties to a sufficient level.

The haze of the polyamide resin measured according to ASTM D1003 may be 3.0% or less, or 1.5% or less, 1.00% or less, or 0.85% or less, or 0.10% to 3.0%, or 0.10% to 1.5%, or 0.10% to 1.00%, or 0.50% to 1.00%, or 0.80% to 1.00%, or 0.81% to 0.97%. When the haze of the polyamide resin measured according to ASTM D1003 is increased by more than 3.0%, the opacity is increased and thus it is difficult to secure a sufficient level of transparency. The polyamide resin may have a haze value measured for the specimen having the thickness of 45 μm or more and 55 μm or less according to ASTM D1003 of 3.0% or less.

Preferably, the polyamide resin satisfies the weight average molecular weight of 330000 g/mol or more, 420000 g/mol or more, or 500000 g/mol or more, or 330000 g/mol to 1000000 g/mol, or 420000 g/mol to 1000000 g/mol, or 500000 g/mol to 1000000 g/mol, or 420000 g/mol to 800000 g/mol, or 420000 g/mol to 600000 g/mol, or 450000 g/mol to 550000 g/mol, and simultaneously it may have the haze measured according to ASTM D1003 of 3.0% or less, or 1.5% or less, 1.00% or less, or 0.85% or less, or 0.10% to 3.0%, or 0.10% to 1.5%, or 0.10% to 1.00%, or 0.50% to 1.00%, or 0.80% to 1.00%, or 0.81% to 0.97%.

The polyamide resin may have a relative viscosity (measured according to ASTM D 2196) of 45000 cps or more, or 60000 cps or more, or 45000 cps to 500000 cps, or 60000 cps to 500000 cps, or 70000 cps to 400000 cps, or 80000 cps to 300000 cps, or 100000 cps to 200000 cps, or 110000 cps to 174000 cps. When the relative viscosity of the polyamide resin (measured according to ASTM D 2196) is reduced to less than 45000 cps, there is a limit that in the film molding process using the polyamide resin, the molding processability is lowered and the efficiency of the molding process is lowered.

As an example of a method for preparing the polyamide resin of one embodiment or another embodiment, a method for preparing a polyamide resin including a step of melt-kneading a compound represented by the following Chemical Formula 7 and a compound represented by the following Chemical Formula 8, and solidifying the melt-kneaded product to form a complex; and a step of reacting the complex with an aromatic diamine monomer can be used.

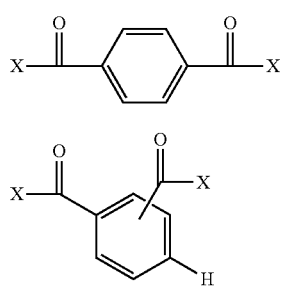

[Chemical formula 7]

[Chemical formula 8]

in Chemical Formulas 7 to 8, X is a halogen or a hydroxyl group.

The present inventors have found through experiments that when the compound represented by Chemical Formula 7 and the compound represented by Chemical Formula 8 are mixed at a temperature equal to or higher than the melting point as in the method for preparing the polyamide resin, it is possible to prepare a complex of monomers mixed uniformly through the melting of the compound represented by Chemical Formula 7 and the compound represented by Chemical Formula 8, and that as this complex is reacted with an aromatic diamine monomer, an amide repeating unit derived from the compound represented by Chemical Formula 7, or a block composed thereof, and an amide repeat uniting derived from the compound represented by Chemical Formula 8, or a block composed thereof can be alternatively polymerized, thereby completing the present invention.

That is, the polyamide resin of one embodiment or another embodiment can be obtained by the preparation method of the polyamide resin.

Specifically, each of the compound represented by Chemical Formula 7 and the compound represented by Chemical Formula 8 exhibits different aspects in solubility and reactivity due to chemical structural differences. Therefore, even when they are added simultaneously, there is a limit in that the amide repeating unit derived from the compound represented by Chemical Formula 7 is predominantly formed and long blocks are formed, thereby increasing the crystallinity of the polyamide resin and making it difficult to secure transparency.

Thus, in the preparation method of the polyamide resin, the compound represented by Chemical Formula 7 and the compound represented by Chemical Formula 8 are not simply physically mixed, but through the formation of a complex by melt-kneading at a temperature higher than each melting point, each monomer was induced to react relatively evenly with the aromatic diamine monomer.

Meanwhile, when synthesizing existing polyamide resin, as the compound represented by Chemical Formula 7 and the compound represented by Chemical Formula 8 are dissolved in a solvent and then reacted with an aromatic diamine monomer in a solution state, there was a limit in that due to the deterioration by moisture or mixing in solvents, the molecular weight of the finally synthesized polyamide resin decreases. Further, due to the difference in the solubility of the compound represented by Chemical Formula 7 and the compound represented by Chemical Formula 8, the amide repeating unit derived from the compound represented by Chemical Formula 7 is predominantly formed and long blocks are formed, thereby increasing the crystallinity of the polyamide resin and making it difficult to secure transparency.

Thus, in the preparation method of the polyamide resin, as a complex obtained by melt-kneading the compound represented by Chemical Formula 7 and the compound represented by Chemical Formula 8 are reacted with the aromatic diamine monomer dissolved in the organic solvent in the form of a solid powder through cooling at a temperature lower than each melting point (minus 10° C. to 30° C., or 0° C. to 30° C., or 10° C. to 30° C.), the molecular weight of the finally synthesized polyamide resin was confirmed to be improved, and it was confirmed through experiments that excellent mechanical properties are secured.

Specifically, the method for preparing the polyamide resin may include melt-kneading the compound represented by Chemical Formula 7 and the compound represented by Chemical Formula 8, and solidifying the melt-kneaded product to form a complex.

In the compound represented by Chemical Formula 7, X is a halogen or a hydroxyl group. Preferably, in Chemical Formula 7, X is chlorine. Specific examples of the compound represented by Chemical Formula 7 include terephthaloyl chloride or terephthalic acid.

The compound represented by Chemical Formula 7 may form a repeating unit represented by Chemical Formula 1 by an amidation reaction of an aromatic diamine monomer. Due to the linear molecular structure, the chain packing and alignment can be kept constant in the polymer, and the surface hardness and mechanical properties of the polyamide film can be improved.

In the compound represented by Chemical Formula 8, X is a halogen or a hydroxyl group. Preferably, in Chemical Formula 8, X is chlorine. Specific examples of the compound represented by Chemical Formula 8 include phthaloyl chloride, phthalic acid, isophthaloyl chloride, or isophthalic acid.

The compound represented by Chemical Formula 8 may form a repeating unit represented by Chemical Formula 2 by an amidation reaction of an aromatic diamine monomer. Due to the curved molecular structure, it has the property of interfering with chain packing and alignment within the polymer, and it is possible to increase the amorphous region in the polyamide resin and thus improve the optical properties and the folding endurance of the polyamide film. In addition, as this is included in the polyamide resin together with the repeating unit represented by Chemical Formula 1, it is possible to increase the molecular weight of the polyamide resin.

Meanwhile, in the step of melt-kneading a compound represented by Chemical Formula 7 and a compound represented by Chemical Formula 8, and solidifying the melt-kneaded product to form a complex, the melt-kneading means mixing the compound represented by Chemical Formula 7 and the compound represented by Chemical Formula 8 at a temperature equal to or higher than the melting point.

In this manner, the compound represented by Chemical Formula 7 and the compound represented by Chemical Formula 8 are not simply physically mixed, but through the formation of a complex by melt-kneading at a temperature higher than each melting point, each monomer was induced to react relatively evenly with the aromatic diamine monomer.

Due to the difference in the solubility of the compound represented by Chemical Formula 7 and the compound represented by Chemical Formula 8, the amide repeating unit derived from the compound represented by Chemical Formula 7 is predominantly formed and long blocks are formed, thereby increasing the crystallinity of the polyamide resin and making it difficult to secure transparency. Therefore, in order to solve these limitations, the first polyamide segment and the second polyamide segment can alternately form a main chain including alternating repeating units represented by Chemical Formula 3 as in one embodiment or another embodiment.

At this time, with respect to 100 parts by weight of the compound represented by Chemical Formula 7, the compound represented by Chemical Formula 8 may be mixed at 5 parts by weight to 60 parts by weight, or 5 parts by weight to 50 parts by weight, or 5 parts by weight to 25 parts by weight, or 10 parts by weight to 30 parts by weight, or 15 parts by weight to 25 parts by weight. Thereby, the technical effect of increasing transmittance and clarity can be realized. When the compound represented by Chemical Formula 8 is mixed in an excessively small amount of less than 5 parts by weight with respect to 100 parts by weight of the compound represented by Chemical Formula 7, the technical problems such as becoming opaque and the increase of haze may occur. When the compound represented by Chemical Formula 8 is mixed in an excessively high amount of more than 60 parts by weight with respect to 100 parts by weight of the compound represented by Chemical Formula 7, the technical problems such as the reduction of physical properties (hardness, tensile strength, etc.) may occur.

In addition, in forming the complex by solidifying the molt-kneaded product, the solidifying means a physical change in which the molt-kneaded product in the molten state is cooled to a temperature equal to or less than the melting point and solidified. Thereby, the formed complex may be in a solid state. More preferably, the complex may be a solid powder obtained through an additional grinding process or the like.

Meanwhile, the step of melt-kneading a compound represented by Chemical Formula 7 and a compound represented by Chemical Formula 8, and solidifying the melt-kneaded product to form a complex may include a step of mixing the compound represented by Chemical Formula 7 and the compound represented by Chemical Formula 8 at a temperature of 50° C. or higher; and a step of cooling the result of the mixing step.

The terephthaloyl chloride has a melting point of 81.3° C. to 83° C., the isophthaloyl chloride has a melting point of 43° C. to 44° C., and the phthaloyl chloride may have a melting point of 6° C. to 12° C. Thereby, when these are mixed at a temperature of 50° C. or higher, or 90° C. or higher, or 50° C. to 120° C., or 90° C. to 120° C., or 95° C. to 110° C., or 100° C. to 110° C., melt-kneading may be performed under the condition of temperature higher than the melting point of both the compound represented by Chemical Formula 7 and the compound represented by Chemical Formula 8.

In the step of cooling the result of the mixing step, the result of the melt-kneading step is left at 5° C. or below, or minus 10° C. to plus 5° C., or minus 5° C. to plus 5° C., which is a temperature condition lower than the melting point of both the compound represented by Chemical Formula 7 and the compound represented by Chemical Formula 8, so that a more uniform solid powder can be obtained through cooling.

Meanwhile, after the step of cooling the result of the mixing step, the method may further include a step of grinding the result of the cooling step. Through the grinding step, a solid complex can be prepared in powder form, and the powder obtained after the grinding step may have an average particle size of 1 mm to 10 mm.

Grinders used for grinding with such particle sizes specifically include a pin mill, a hammer mill, a screw mill, a roll mill, a disc mill, a jog mill or sieve, a jaw crusher, and the like, but are not limited to the examples described above.

In this manner, as the melt mixture of the compound represented by Chemical Formula 7 and the compound represented by Chemical Formula 8 is reacted with the aromatic diamine monomer in the form of solids, specifically solid powders, through the cooling at a temperature lower than the melting point, the deterioration the compound represented by Chemical Formula 7 and the compound represented by Chemical Formula 8 due to moisture or their mixing in solvents is minimized, the molecular weight of the finally synthesized polyamide resin is increased, and thereby excellent mechanical properties of the polyamide resin can be ensured.

In addition, after the step of melt-kneading a compound represented by the following Chemical Formula 7 and a compound represented by the following Chemical Formula 8, and solidifying the melt-kneaded product to form a complex, the method for preparing the polyamide resin may include a step of reacting the complex with an aromatic diamine monomer.

The reaction in the step of reacting the complex with an aromatic diamine monomer may be performed under an inert gas atmosphere at a temperature condition of minus 25° C. to 25° C. or a temperature condition of minus 25° C. to 0° C.

Specific examples of the aromatic diamine monomer include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

More preferably, as the aromatic diamine monomer, 2,2'-bis(trifluoromethyl)-4,4'-biphenyldiamine (TFDB), 2,2'-dimethyl-4,4'-diaminobenzidine, m-xylylenediamine, or p-xylylenediamine can be used.

More specifically, the step of reacting the complex with an aromatic diamine monomer may include a step of dissolving the aromatic diamine monomer in an organic solvent to prepare a diamine solution; and a step of adding a complex powder to the diamine solution.

In the step of dissolving the aromatic diamine monomer in an organic solvent to prepare a diamine solution, the aromatic diamine monomer included in the diamine solution may be present in a state dissolved in an organic solvent. Examples of the solvent are not particularly limited, but for example, common general-purpose organic solvents such as N-methylformamide, N,N-dimethylformamide, N,N-diethylformamide, N,N-dimethylacetamide, N,N-diethylacetamide, N,N-dimethylpropionamide, 3-methoxy-N,N-dimethylpropionamide, dimethyl sulfoxide, acetone, N-methyl-2-pyrrolidone, N-ethyl-2-pyrrolidone, tetrahydrofuran, chloroform, gamma-butyrolactone, ethyl lactate, methyl 3-methoxypropionate, methyl isobutyl ketone, toluene, xylene, methanol, ethanol, or the like can be used without limitation.

In the step of adding a complex powder to the diamine solution, the complex powder will react with the aromatic diamine monomer dissolved in the diamine solution. As a result, the deterioration the compound represented by Chemical Formula 7 and the compound represented by Chemical Formula 8 due to moisture, or their mixing in solvents is minimized, the molecular weight of the finally synthesized polyamide resin is increased, and thereby excellent mechanical properties of the polyamide resin can be ensured.

After the step of cooling the result of the mixing step, the complex powder can prepare a complex of solids in the form of powder through the step of grinding the result of the cooling step. The powder obtained after the grinding step may have an average particle size of 1 mm to 10 mm.

II. Polymer Film

According to another embodiment of the invention, there may be provided a polymer film comprising the polyamide resin of one embodiment or another embodiment.

The details concerning the polyamide resin can include all of those described in the one embodiment or another embodiment.

More specifically, the polymer film may include a polyamide resin of one embodiment or another embodiment or a cured product thereof. The cured product means a material obtained through a curing process of the polyamide resin of the one embodiment or another embodiment.

When the polymer film is prepared using the polyamide resin of the one embodiment or another embodiment, excellent optical and mechanical properties can be realized, and simultaneously flexibility can be provided, so that it can be used as a material for various molded articles. For example, the polymer film may be applied to a display substrate, a display protective film, a touch panel, a window cover of a foldable device, and the like.

The thickness of the polymer film is not particularly limited, but for example, it can be freely adjusted within the range of 0.01 µm to 1000 µm. When the thickness of the polymer film increases or decreases by a specific value, the physical properties measured in the polymer film may also change by a certain value.

The polymer film may be prepared by a conventional method such as a dry method or a wet method using the polyamide resin of the one embodiment or another embodiment. For example, the polymer film may be formed by a method of coating a solution containing the polyamide resin of one embodiment or another embodiment on an arbitrary support to form a film, evaporating the solvent from the membrane and drying it. If necessary, stretching and heat treatment of the polymer film may be further performed.

As the polymer film is produced using the polyamide resin of the one embodiment or the other embodiment, it may exhibit excellent mechanical properties while being colorless and transparent.

Specifically, the polymer film has a haze value measured for a specimen having a thickness of 50±2 µm according to ASTM D1003 of 3.0% or less, or 1.5% or less, 1.00% or less, or 0.85% or less, or 0.10% to 3.0%, or 0.10% to 1.5%, or 0.10% to 1.00%, or 0.50% to 1.00%, or 0.80% to 1.00%, or 0.81% to 0.97%. When the haze the polymer film measured according to ASTM D1003 is increased by more than 3.0%, the opacity is increased and thus it is difficult to secure a sufficient level of transparency.

The polymer film has a yellowness index (YI) measured for a specimen having a thickness of 50±2 µm according to ASTM E313 of 4.0 or less, or 3.0 or less, or 0.5 to 4.0, or 0.5 to 3.0. When the yellowness index (YI) of the polymer film measured according to ASTM E313 is increased by more than 4.0, the opacity is increased and thus it is difficult to secure a sufficient level of transparency.

Further, the polymer film may have a transmittance (T, @550 nm) for visible light at wavelength of 550 nm for a specimen having a thickness of 50±2 µm of 86% or more, or 86% to 90%. The transmittance (T, @388 nm) for UV light at wavelength of 388 nm may be 50.00% or more, or 60.00% or more.

Further, the polymer film may have a folding endurance measured for a specimen having a thickness of 50±2 µm (the number of reciprocating bending cycles at an angle of 135°, a rate of 175 rpm, a radius of curvature of 0.8 mm and a load of 250 g) of 4000 cycles or more, or 7000 cycles or more, or 9000 cycles or more, or 4000 cycles to 20000 Cycles, or 7000 cycles to 20000 cycles, or 9000 cycles to 20000 cycles.

Further, the polymer film may have a pencil hardness value measured for a specimen having a thickness of 50±2 µm according to ASTM D3363 of 1H or more, or 3H or more, or 1H to 4H, or 3H to 4H.

III. Resin Laminate

According to yet another aspect of the present invention, there can be provided a resin laminate including a substrate including the polyamide resin; and a hard coating layer formed on at least one side of the substrate.

The substrate may include the polyamide resin of one embodiment or another embodiment, and it may also include a polymer film of the other embodiment. The details concerning the polyamide resin may include all of those described in the one embodiment or another embodiment, and the details concerning the polymer film may include all of those described in the other embodiment.

A hard coating layer may be formed on at least one side of the substrate. A hard coating layer may be formed on one side or both sides of the substrate. When the hard coating layer is formed only on one side of the substrate, a polymer film including one or more polymers selected from the group consisting of polyimide-based, polycarbonate-based, polyester-based, polyalkyl(meth)acrylate-based, polyolefin-based and polycyclic olefin-based polymers may formed on the opposite side of the substrate.

The hard coating layer may have a thickness of 0.1 μm to 100 μm.

The hard coating layer can be used without particular limitation as long as it is a material known in the field of hard coating. For example, the hard coating layer may include a binder resin of photocurable resin; and inorganic particles or organic particles dispersed in the binder resin.

The photocurable resin contained in the hard coating layer is a polymer of a photocurable compound which can cause a polymerization reaction when irradiated with light such as ultraviolet rays, and may be one conventionally used in the art. However, preferably, the photocurable compound may be a polyfunctional (meth)acrylate monomer or oligomer. At this time, it is advantageous in terms of ensuring the physical properties of the hard coating layer that the number of (meth)acrylate-based functional groups is 2 to 10, 2 to 8, or 2 to 7. Alternatively, the photocurable compound may be at least one selected from the group consisting of pentaerythritol tri(meth)acrylate, pentaerythritol tetra(meth)acrylate, dipentaerythritol penta(meth)acrylate, dipentaerythritol hexa(meth)acrylate, dipentaerythritol hepta(meth)acrylate, tripentaerythritol hepta(meth)acrylate, trilene diisocyanate, xylene diisocyanate, hexamethylene diisocyanate, trimethylolpropane tri(meth)acrylate, and trimethylolpropane polyethoxy tri(meth)acrylate.

The inorganic particles may be, for example, silica, metal atoms such as silica, aluminum, titanium, or zinc, or oxides or nitrides thereof. Silica fine particles, aluminum oxide particles, titanium oxide particles, zinc oxide particles, and the like can be used independently of each other.

The inorganic particles may have an average radius of 100 nm or less, or 5 to 100 nm. The type of the organic particles is not limited, and for example, polymer particles having an average particle size of 10 nm to 100 μm may be used.

The resin laminate can be used as a substrate or a cover window of a display device, or the like. It has high flexibility and bending durability together with high transmittance and low haze properties, so that it can be used as a substrate or cover window of a flexible display device. That is, the display device including the resin laminate, or the flexible display device including the resin laminate may be implemented.

Advantageous Effects

According to the present invention, there can be provided a polyamide resin that can secure at least an adequate level of mechanical properties while improving transparency by suppressing excessive growth of the length of crystalline polymer chains, and further is improved in UV shielding function, and a polymer film and resin laminate using the same.

In addition, according to the present invention, there can be provided a polyamide resin that can secure at least an adequate level of mechanical properties while improving transparency by suppressing excessive growth of the length of crystalline polymer chains, and a polymer film and resin laminate using the same.

BRIEF DESCRIPTION OF DRAWINGS

FIG. 1 shows a schematic diagram of the crystal structure of the polyamide resin obtained in (1) of Example 1.

FIG. 2 shows a $^{13}$C-NMR spectrum of the polyamide resin obtained in (1) of Example 1.

FIG. 3 shows a $^{13}$C-NMR spectrum of the polyamide resin obtained in (1) of Example 2.

FIG. 4 shows a graph of a small-angle X-ray scattering function I(q) of the polyamide resin obtained in Examples and Comparative Examples.

FIG. 5 schematically shows formation of individual crystals by gathering polyamide resin chains in a bundle.

DETAILED DESCRIPTION OF THE EMBODIMENTS

Hereinafter, embodiments of the present invention will be described in more detail by way of examples. However, these examples are presented for illustrative purposes only, and are not intended to limit the scope of the present invention.

Preparation Example: Preparation of Acyl Chloride Complex

Preparation Example 1

549.4 g (2.704 mol) of terephthaloyl chloride (TPC; melting point: 83° C.) and 120.6 g (0.594 mol) of isophthaloyl chloride (IPC: melting point: 44° C.) were added to a 1000 mL 4-neck round flask (reactor) equipped with a stirrer, a nitrogen injection device, a dropping funnel and a temperature controller, and the mixture was melt-kneaded at 100° C. for 3 hours and then cooled at 0° C. for 12 hours to prepare a complex of acylchloride (specifically, terephthaloyl chloride and isophthaloyl chloride).

Subsequently, the acyl chloride complex was grinded with a jaw crusher to prepare a powder having an average particle size of 5 mm.

Preparation Example 2

An acylchloride complex was prepared in the same manner as in Preparation Example 1, except that 569.5 g (2.803 mol) of terephthaloyl chloride (TPC: melting point: 83° C.) and 100.5 g (0.495 mol) of isophthaloyl chloride (IPC; melting point: 44° C.) were added.

Example: Preparation of Polyamide Resin and Polymer Film

Example 1

(1) Polyamide Resin 262 g of N,N-dimethylacetamide (DMAc) was filled into a 500 mL 4-neck round flask (reactor) equipped with a stirrer, a nitrogen injection device, a dropping funnel and a temperature controller while slowly blowing nitrogen into the reactor. Then, the temperature of the reactor was adjusted to 0° C., and 14.153 g (0.0442 mol) of 2,2'-bis(trifluoromethyl)-4,4'-biphenyldiamine (TFDB) was added and dissolved.

The mixture was stirred while adding 8.972 g (0.0442 mol) of the acyl chloride complex powder obtained in Preparation Example 1, and subjected to amide formation reaction at 0° C. for 12 hours.

After completion of the reaction, N,N-dimethylacetamide (DMAc) was added to dilute the solution to a solid content of 5% or less, and the resultant was precipitated with 1 L of methanol. The precipitated solids were filtered and then dried at 100° C. under vacuum for 6 hours or more to prepare a solid-state polyamide resin.

It was confirmed through $^{13}$C-NMR shown in FIG. 2 that the polyamide resin obtained in (1) of Example 1, contained 82 mol % of the first repeating unit obtained by an amide reaction of terephthaloyl chloride (TPC) and 2,2'-bis(trifluoromethyl)-4,4'-biphenyldiamine (TFDB) and 18 mol % of the second repeating unit obtained by an amide reaction of isophthaloyl chloride (IPC) and 2,2'-bis(trifluoromethyl)-4,4'-biphenyldiamine (TFDB).

(2) Polymer Film

The polyamide resin obtained in (1) of Example 1 was dissolved in N,N-dimethylacetamide to prepare about 10% (w/v) polymer solution.

The polymer solution was applied onto a polyimide base film (UPILEX-75s, UBE), and the thickness of the polymer solution was uniformly adjusted using a film applicator.

Then, after drying for 15 minutes at 80° C. Mathis oven, it was cured for 30 minutes at 250° C. while flowing nitrogen, and peeled from the substrate film to obtain a polymer film.

Example 2

(1) Polyamide Resin

A polyamide resin was prepared in the same manner as in (1) of Example 1, except that the acyl chloride complex powder obtained in Preparation Example 2 was used instead of the acyl chloride complex powder obtained in Preparation Example 1.

It was confirmed through $^{13}$C-NMR shown in FIG. 3 that the polyamide resin obtained in (1) of Example 2, contained 85 mol % of the first repeating unit obtained by an amide reaction of terephthaloyl chloride (TPC) and 2,2'-bis(trifluoromethyl)-4,4'-biphenyldiamine (TFDB), and 15 mol % of the second repeating unit obtained by an amide reaction of isophthaloyl chloride (IPC) and 2,2'-bis(trifluoromethyl)-4,4'-biphenyldiamine (TFDB).

(2) Polymer Film

A polymer film was prepared in the same manner as in (2) of Example 1, except that the polyamide resin obtained in (1) of Example 2 was used instead of the polyamide resin obtained in (1) of Example 1.

Comparative Example: Preparation of Polyamide Resin and Polymer Film

Comparative Example 1

(1) Polyamide Resin

A polyamide resin was prepared in the same manner as in (1) of Example 1, except that instead of the acyl chloride complex powder obtained in Preparation Example 1, 7.358 g (0.0362 mol) of terephthaloyl chloride (TPC) and 1.615 g (0.0080 mol) of isophthaloyl chloride (IPC) were added simultaneously to perform an amide formation reaction.

(2) Polymer Film

A polymer film was prepared in the same manner as in (2) of Example 1, except that the polyamide resin obtained in (1) of Comparative Example 1 was used instead of the polyamide resin obtained in (1) of Example 1.

Comparative Example 2

(1) Polyamide Resin

A polyamide resin was prepared in the same manner as in (1) of Example 1, except that instead of the acyl chloride complex powder obtained in Preparation Example 1, 7.358 g (0.0362 mol) of terephthaloyl chloride (TPC) was first added, and then 1.615 g (0.0080 mol) of isophthaloyl chloride (IPC) was added sequentially at about 5 minute intervals to perform an amide formation reaction.

(2) Polymer Film

A polymer film was prepared in the same manner as in (2) of Example 1, except that the polyamide resin obtained in (1) of Comparative Example 2 was used instead of the polyamide resin obtained in (1) of Example 1.

Comparative Example 3

(1) Polyamide Resin

A polyamide resin was prepared in the same manner as in (1) of Example 1, except that instead of the acyl chloride complex powder obtained in Preparation Example 1, 1.615 g (0.0080 mol) of isophthaloyl chloride (IPC) was first added, and then 7.358 g (0.0362 mole) of terephthaloyl chloride (TPC) was added sequentially at about 5 minute intervals to perform an amide formation reaction.

(2) Polymer Film

A polymer film was prepared in the same manner as in (2) of Example 1, except that the polyamide resin obtained in (1) of Comparative Example 3 was used instead of the polyamide resin obtained in (1) of Example 1.

Experimental Example 1

The properties of the individual crystals contained in the polyamide resins obtained in Examples, Comparative Examples were measured by the following method using a small-angle X-ray scattering method (SAXS), and the results are shown in Table 1 below.

The polymer films obtained in Examples and Comparative Examples were used to prepare a sample with a size of 1 cm in width*1 cm in length. The sample was set on a small angle X-ray scattering apparatus (PLS-9A USAXS beam line) having a camera length of 2.5 m, 6.5 m at room temperature (23° C.), and irradiated with X-rays having an energy of 11.1 KeV, 19.9 KeV to obtain a scattering pattern. The scattering pattern was analyzed through the analysis equipment (NIST SANS package) mounted on the small angle X-ray scattering apparatus to determine the average particle size (2Rc), dimensionality, and crystallinity of the individual crystals.

Specifically, the analysis of the average particle size (2Rc), dimensionality, and crystallinity of the individual crystals was performed through a computer program (NIST SANS package) using the data obtained from a small angle X-ray scattering apparatus (PLS 9A beamline). More specifically, the average particle size of the individual crystals can be obtained through the calculation of computer program (NIST SANS package) for the diameter distribution curve of crystals which is obtained by fitting the shape of individual crystals contained in the sample to a solid sphere model, plotting the obtained wavenumber q (unit: Å$^{-1}$) and scattering intensity I (unit: a.u.), and convoluting the plot with a Schulz-Zimm distribution.

TABLE 1

| | Average particle size of crystals (nm) | Dimensionality | Degree of crystallinity (%) |
|---|---|---|---|
| Example 1 | 5.0 | 3.7 | Difficult to measure at less than 20% |
| Example 2 | 6.8 | — | Difficult to measure at less than 20% |
| Comparative Example 1 | 8.4 | 4.0 | Difficult to measure at less than 20% |
| Comparative Example 2 | 13.4 | 3.2 | 24 |
| Comparative Example 3 | 8.1 | — | Difficult to measure at less than 20% |

As shown in Table 1. it could be confirmed that the average particle size of the individual crystals contained in the polyamide resin obtained in Examples was measured to be as small as 5 nm to 6.8 nm, whereas the average particle size of the individual crystals contained in the polyamide resin obtained in Comparative Example 1 was 8.4 nm, the average particle size of the individual crystals contained in the polyamide resin obtained in Comparative Example 2 was 13.4 nm, and the average particle size of the individual crystals contained in the polyamide resin obtained in Comparative Example 3 was 8.1 nm, which increased as compared to Examples. In addition, it was confirmed that the crystallinity of the polyamide resin obtained in Examples showed a low degree of crystallinity of less than 20%. while the degree of crystallinity of the polyamide resin obtained in Comparative Example 2 was 24%, which increased compared to Examples.

Thereby, it was confirmed that in the case of the polyamide resin obtained in Examples, the growth of the length of the crystalline block consisting of a repeating unit obtained by an amide reaction of terephthaloyl chloride (TPC) and 2,2'-bis(trifluoromethyl)-4,4'-biphenyldiamine (TFDB) was suppressed compared with Comparative Examples.

Experimental Example 2

A graph of the small-angle X-ray scattering function I(q) of the polyamide resins obtained in Examples and Comparative Examples using a small-angle X-ray scattering method (SAXS) is shown in FIG. 4 below.

The graph of the small-angle X-ray scattering function I(q) was obtained by transmitting X-rays to the sample from u-SAXS beam-line 9A at Pohang light source laboratory and measuring the scattering intensity according to the wavenumber q.

Specifically, the polymer films obtained in Examples and Comparative Examples were used to prepare a sample with a size of 1 cm in width*1 cm in length*50 μm in thickness. The sample was set on a small angle X-ray scattering apparatus (PLS-9A u-SAXS beam line 9A) having a camera length of 2.5 m, 6.5 m at room temperature (23° C.), and irradiated with X-rays having an energy of 11.1 KeV (6.5 m from sample), 19.9 KeV (2.5 m from sample). Two-dimensional images were obtained through a 2D CCD detector (manufactured by Rayonix SX165), averaged into a circle based on the beam stop and converted into a one-dimensional image. Two data were merged using the NIST SANS data reduction package.

Then, it was fitted to a solid sphere model using the NIST SANS package, which is a computer program. A graph of the function I(q) (wavenumber range of 0.0024 Å$^{-1}$ to 0.5 Å$^{-1}$) whose X axis is the wavenumber q (unit: Å$^{-1}$), and Y-axis is the scattering intensity I (unit: a.u.) was obtained using P. Grady's Excel program.

As shown in FIG. 4 below, it was confirmed that the small-angle X-ray scattering function I(q) of the polyamide resins obtained in Examples 1 and 2 had a downward convex curve profile at 0.003 Å$^{-1}$≤q≤0.03 Å$^{-1}$, had an intensity of about 10 a.u. at 0.08 Å$^{-1}$≤q and an intensity of about 8000 a.u. at q=0.003 Å$^{-1}$.

On the other hand, it was confirmed that the small-angle X-ray scattering profile of the polyamide resin obtained in Comparative Example 1 had a downward convex curve profile at 0.003 Å$^{-1}$≤q≤0.03 Å$^{-1}$, but had an intensity of about 0.01 a.u. at 0.08 Å$^{-1}$≤q and an intensity of about 80 a.u. at q=0.003 Å$^{-1}$, which were different from Example 1.

Further, it was confirmed that the small-angle X-ray scattering profile of the polyamide resin obtained in Comparative Example 2 had an upward convex curve profile at 0.003 Å$^{-1}$≤q≤0.03 Å$^{-1}$, and had an intensity of about 0.1 a.u. at 0.08 Å$^{-1}$≤q and an intensity of about 200 a.u. at q=0.003 Å$^{-1}$, which were different from Example 1.

Experimental Example 3

The following characteristics were measured or evaluated for the polyamide resins or the polymer films obtained in the above examples and comparative examples, and the results are shown in Table 2 below.

(1) Thickness: The thickness of the polymer film was measured using a thickness measuring device.

(2) Yellowness index (Y.I.): The yellowness index of the polymer film was measured according to the measurement method of ASTM E313 using a COH-400 Spectrophotometer (NIPPON DENSHOKU INDUSTRIES).

(3) Transmittance: The total light transmittance of the polymer film was measured using a Shimadzu UV-2600 UV-vis spectrometer. In the measurement results, the transmittance (T, @388 nm) for ultraviolet light at a wavelength of 388 nm and the transmittance (T, @550 nm) for visible light at wavelength of 550 nm were shown.

(4) Haze: The haze value of the polymer film was measured according to the ASTM D1003 test method using a COH-400 Spectrophotometer (NIPPON DENSHOKU INDUSTRIES).

(5) Molecular weight and polydispersity index (PDI): The weight average molecular weight (Mw) and the number average molecular weight (Mn) of the polyamide resin were measured by gel permeation chromatography (GPC, manufactured by Waters), and the polydispersity index (PDI) was calculated by dividing the weight average molecular weight by the number average molecular weight. Specifically, the measurement was performed using a 600 mm long column connecting two Polymer Laboratories PLgel MIX-B Columns (300 mm in length), through Waters 2605 Refractive Index (RI) Detector, wherein the evaluation temperature was 50 to 75° C. (about 65° C.), DMF 100 wt % solvent was used, the flow rate was 1 mL/min, and the sample was prepared at a concentration of 1 mg/mL and supplied in an amount of 100 μL for 25 minutes. The molecular weights could be determined using calibration curves formed using polystyrene standards. As the molecular weight of polystyrene standard products, 7 types of 3940/9600/31420/113300/327300/1270000/4230000 were used.

(6) Bending Property: The folding endurance of the polymer films was evaluated using an MIT type folding endurance tester. Specifically, a specimen (1 cm*7 cm) of the polymer film was loaded into the folding endurance tester, and folded to an angle of 135° at a rate of 175 rpm on the left and right sides of the specimen, with a radius of curvature of 0.8 mm and a load of 250 g, until the specimen was bended and fractured. The number of reciprocating bending cycles was measured as the folding endurance.

(7) Viscosity: Under a constant reflux system at 25±0.2° C., the viscosity of the solution containing polyamide resin (solvent: dimethylacetamide (DMAc), solid content: 10 wt %) was measured according to ASTM D 2196: test method of non-Newtonian materials by Brookfield DV-2T Rotational Viscometer. As Brookfield silicone standard oil, a number of standard solutions having a viscosity range of 5000 cps to 200000 cps was used. The measurement was performed with a spindle LV-4 (64), 0.3-100 RPM, and the unit was cps (mPa·s).

(8) Pencil Hardness: The pencil hardness of the polymer films was measured according to the ASTM D3363 test method using a Pencil Hardness Tester. Specifically, varying hardness values of pencils were fixed to the tester and scratched on the polymer film, and the degree of occurrence of a scratch on the polymer film was observed with the naked eye or with a microscope. When more than 70% of the total number of scratches were not observed, a value corresponding to the hardness of the pencil was evaluated as the pencil hardness of the polymer film.

The pencil hardness is increased in the order of B grade, F grade and H grade. Within the same grade, the higher the number, the higher the hardness. Within the grade, the higher the number, the higher the hardness.

(9) UV-cut off wavelength (λ) and UV-cut slope (dT/dλ): The UV-cut off wavelength (λ) and UV-cut slope (dT/dλ) of the polyamide resin film were measured according to the ASTM E424 test method using a UV-Vis spectrophotometer (manufacturer: Shimadzu, model: UV2600). The UV-cut slope (dT/dλ) was measured in the range of 10% to 80% transmittance, and the UV-cut off was expressed as the wavelength when the transmittance was less than 1%.

Looking at Table 2 above, the polyamide resin of Examples prepared using the acyl chloride complex powder according to Preparation Examples 1 to 2 had a high weight average molecular weight of 463000 g/mol to 512000 g/mol, and the relative viscosity was measured to be as high as 110000 cps to 174000 cps. Moreover, it was confirmed that the polymer film obtained from the polyamide resin of Examples had a low yellowness index of 2.68 to 2.89 and a low haze value of 0.81% to 0.97% at a thickness of about 50 μm, thereby exhibiting excellent transparency. It was also confirmed that it had a high pencil hardness of 3H to 4H grade and a folding endurance that was broken at the number of reciprocating bending cycles from 9785 to 12022, thereby securing excellent mechanical properties (scratch resistance and folding endurance).

In addition, it was confirmed that it had a high UV-cut slope of 0.35 or more in the range of 10% to 80% transmittance, thereby realizing excellent UV shielding function.

On the other hand, in the case of the polyamide resins of Comparative Examples in which the acyl chloride complex powder according to Preparation Examples 1 to 2 was not used in the synthesis process of the polyamide resin, the molecular weight was reduced from 350,000 g/mol to 412,000 g/mol compared to Examples. The viscosity was reduced from 24,000 cps to 54,000 cps compared to Examples.

On the other hand, in the case of the polymer films obtained from the polyamide resins of Comparative Examples 1, 2, and 3 in which TPC powder and IPC powder were simultaneously or sequentially added, it was confirmed that the films had a yellowness index of 4.59 to 25.10 and a haze value of 1.61% to 24.21% at a thickness of about 50 μm, which increased compared to Examples, resulting in poor transparency. This is considered to be because, in Comparative Examples 1, 2, and 3, due to the difference in solubility and reactivity between the TPC powder and the IPC powder, the block due to TPC is excessively formed, thereby increasing the crystallinity of the polyamide resin.

EXPLANATION OF SYMBOLS

1: individual crystals
2: average particle size of individual crystals
3: amorphous polymer chain

TABLE 2

| Category | Example 1 | Example 2 | Comparative Example 1 | Comparative Example 2 | Comparative Example 3 |
| --- | --- | --- | --- | --- | --- |
| Thickness (μm) | 50 | 49 | 51 | 51 | 50 |
| Y.I. | 2.68 | 2.89 | 8.55 | 25.10 | 4.59 |
| T (%)@550 nm | 88.75 | 88.50 | 85.63 | 75.94 | 87.57 |
| T (%)@388 nm | 75.3 | 71.0 | 51.01 | 31.62 | 65.04 |
| Haze(%) | 0.81 | 0.97 | 3.43 | 24.21 | 1.61 |
| Mw(g/mol) | 512000 | 463000 | 412000 | 350000 | 382000 |
| Bending property (Cycle) | 12022 | 9785 | 5210 | 785 | 4513 |
| PDI | 1.84 | 2.71 | 2.05 | 2.02 | 1.98 |
| Viscosity (cps) | 110000 | 174000 | 54000 | 24000 | 28000 |
| Pencil hardness | 3H | 4H | 1H | F | 1H |
| UV-cut slope (dT/dλ)@10% | 2.90 | 2.45 | — | — | — |
| UV-cut slope (dT/dλ)@80% | 0.36 | 0.68 | — | — | — |
| UV-cut slope (dT/dλ) Maximum value@10~80% | 4.56 | 3.67 | — | — | — |
| UV-cut slope(dT/dλ) Minimum value@10~80% | 0.35 | 0.68 | — | — | — |

The invention claimed is:

1. A polyamide resin in which an average particle size of individual crystals measured by a small-angle X-ray scattering apparatus is 8.0 nm or less, and a UV-cut slope (dT/dλ) measured for a polyamide resin specimen having a thickness of 45 μm or more and 55 μm or less according to ASTM E424 is at least 0.25 in the range of 10% to 80% transmittance,
   wherein amorphous polymer chains are present between the individual crystals having the average particle size of 8.0 nm or less,
   wherein a first polyamide segment is included in the individual crystals having the average particle size of 8.0 nm or less,
   wherein a second polyamide segment is included in the amorphous polymer chains present between the individual crystals having the average particle size of 8.0 nm or less, and,
   wherein the first polyamide segment and the second polyamide segment form a main chain including an alternating-repeating unit represented by the following Chemical Formula 4:

[Chemical Formula 4]

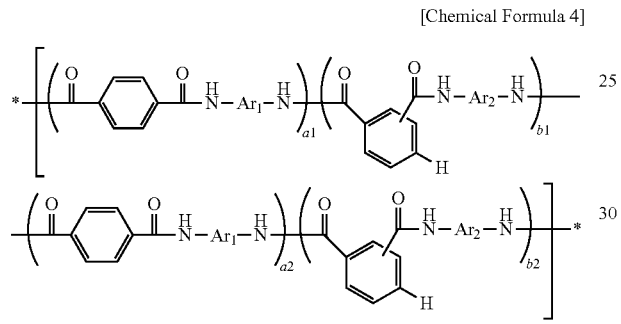

in the Chemical Formula 4,
   $Ar_1$ and $Ar_2$ are each independently a substituted or unsubstituted arylene group having 6 to 20 carbon atoms, or a substituted or unsubstituted heteroarylene group having 2 to 20 carbon atoms,
   a1 and a2 are each independently an integer of 1 to 10, and
   b1 and b2 are each independently an integer of 1 to 5.

2. The polyamide resin according to claim 1, wherein the average particle size of the individual crystals is measured through an analytical equipment by fitting a scattering pattern obtained by irradiating X-rays with energies of 10 KeV to 20 KeV in the small-angle X-ray scattering apparatus to a solid sphere model.

3. The polyamide resin according to claim 1, wherein a distance between the individual crystals having the average particle size of 8.0 nm or less is 0.1 nm to 100 nm.

4. The polyamide resin according to claim 1, wherein the individual crystals having the average particle size of 8.0 nm or less comprises a first polyamide segment including a repeating unit represented by the following Chemical Formula 1, or a block comprised thereof:

[Chemical Formula 1]

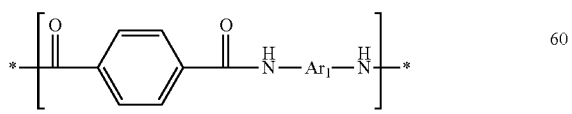

in the Chemical Formula 1, $Ar_1$ is a substituted or unsubstituted arylene group having 6 to 20 carbon atoms, or a substituted or unsubstituted heteroarylene group having 2 to 20 carbon atoms.

5. The polyamide resin according to claim 1, wherein a degree of crystallinity measured by the small-angle X-ray scattering apparatus is 20% or less.

6. The polyamide resin according to claim 4, wherein amorphous polymer chains present between the individual crystals having the average particle size of 8.0 nm or less including the first polyamide segment including the repeating unit represented by the Chemical Formula 1 or the block composed thereof comprise a second polyamide segment including a repeating unit represented by the following Chemical formula 2, or a block composed thereof:

[Chemical Formula 2]

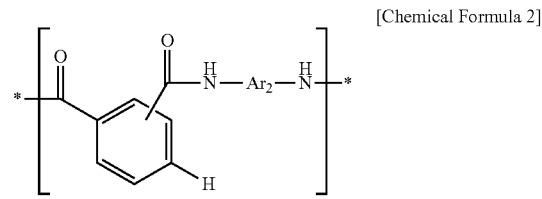

in the Chemical Formula 2,
   $Ar_2$ is a substituted or unsubstituted arylene group having 6 to 20 carbon atoms, or a substituted or unsubstituted heteroarylene group having 2 to 20 carbon atoms.

7. A polyamide resin having a small-angle X-ray scattering function I(q) that satisfies the following Equation 1 and Equation 2,
   wherein X-axis is a wavenumber q and Y-axis is a scattering intensity I in the small-angle X-ray scattering function I(q) and the small angle X-ray scattering function I(q) is obtained by irradiating a polyamide resin specimen having a thickness of 45 μm or more and 55 μm or less with X-rays using a small-angle X-ray scattering apparatus:

$$d^2I(q)/dq^2 > 0 \qquad \text{[Equation 1]}$$

in the Equation 1, $0.003 \text{ Å}^{-1} \leq q \leq 0.03 \text{ Å}^{-1}$, $$I(q) \geq 1 \text{ a.u.} \qquad \text{[Equation 2]}$$

in the Equation 2, $q \geq 0.08 \text{ Å}^{-1}$,
   wherein the polyamide resin comprises a first polyamide segment including a repeating unit represented by the following Chemical Formula 1, or a block comprised thereof,

[Chemical Formula 1]

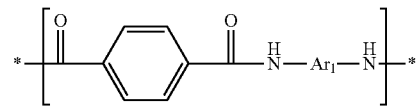

in the Chemical Formula 1, $Ar^1$ is a substituted or unsubstituted arylene group having 6 to 20 carbon atoms, or a substituted or unsubstituted heteroarylene group having 2 to 20 carbon atoms,
   wherein the polyamide resin further comprises a second polyamide segment including a repeating unit represented by the following Chemical formula 2, or a block composed thereof,

[Chemical Formula 2]

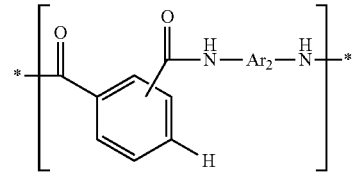

in the Chemical Formula 2,
Ar² is a substituted or unsubstituted arylene group having 6 to 20 carbon atoms, or a substituted or unsubstituted heteroarylene group having 2 to 20 carbon atoms, and,
wherein the first polyamide segment and the second polyamide segment form a main chain including an alternating-repeating unit represented by the following Chemical Formula 4:

[Chemical Formula 4]

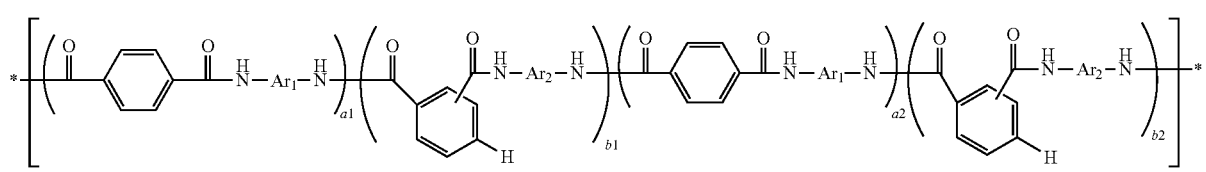

in the Chemical Formula 4,
Ar$_1$ and Ar$_2$ are each independently a substituted or unsubstituted arylene group having 6 to 20 carbon atoms, or a substituted or unsubstituted heteroarylene group having 2 to 20 carbon atoms,
a1 and a2 are each independently an integer of 1 to 10, and
b1 and b2 are each independently an integer of 1 to 5.

8. The polyamide resin according to claim 7, wherein the polyamide resin further satisfies the following Equation 3 for the polyamide resin specimen having the thickness of 45 μm or more and 55 μm or less:

$I(0.003\ \text{Å}^{-1}) \geq 1000$ a.u.     [Equation 3]

9. The polyamide resin according to claim 7, wherein the polyamide resin further satisfies the following Equation 4 for the polyamide resin specimen having the thickness of 45 μm or more and 55 μm or less:

$dI(q)/dq < 0$     [Equation 4]

in the Equation 4, $0.003\ \text{Å}^{-1} \leq q \leq 0.03\ \text{Å}^{-1}$.

10. The polyamide resin according to claim 7, wherein the polyamide resin further satisfies the following Equation 5 for the polyamide resin specimen having the thickness of 45 μm or more and 55 μm or less:

$100 \leq I(0.003\ \text{Å}^{-1})/I(0.08\ \text{Å}^{-1}) \leq 1000$.     [Equation 5]

11. The polyamide resin according to claim 4, wherein the first polyamide segment has a number average molecular weight of 100 g/mol or more and 5000 g/mol or less.

12. The polyamide resin according to claim 6, wherein based on the total repeating units contained in the polyamide resin, a content of the repeating units represented by Chemical Formula 1 is 60 mol % to 95 mol %, and a content of the repeating units represented by Chemical Formula 2 is 5 mol % to 40 mol %.

13. A polymer film comprising the polyamide resin according to claim 1.

14. A resin laminate comprising:
a substrate including the polyamide resin according to claim 1; and
a hard coating layer formed on at least one side of the substrate.

15. A polymer film comprising the polyamide resin according to claim 7.

16. A resin laminate comprising:
a substrate including the polyamide resin according to claim 7; and
a hard coating layer formed on at least one side of the substrate.

* * * * *